(12) United States Patent
King et al.

(10) Patent No.: US 12,184,390 B2
(45) Date of Patent: Dec. 31, 2024

(54) SYSTEM AND METHOD FOR MANAGING CHANNEL BANDWIDTH OF A COMMUNICATION SIGNAL

(71) Applicant: KRATOS INTEGRAL HOLDINGS, LLC, San Diego, CA (US)

(72) Inventors: Brandon Gregory King, San Diego, CA (US); Jeffrey David Jarriel, San Diego, CA (US); Matthew James Stoltenberg, San Diego, CA (US); Daniel Joseph Sutton, San Diego, CA (US)

(73) Assignee: KRATOS INTEGRAL HOLDINGS, LLC, San Diego, CA (US)

( * ) Notice: Subject to any disclaimer, the term of this patent is extended or adjusted under 35 U.S.C. 154(b) by 326 days.

(21) Appl. No.: 17/785,346

(22) PCT Filed: Dec. 16, 2020

(86) PCT No.: PCT/US2020/065358
§ 371 (c)(1),
(2) Date: Jun. 14, 2022

(87) PCT Pub. No.: WO2021/127010
PCT Pub. Date: Jun. 24, 2021

(65) Prior Publication Data
US 2023/0006733 A1 Jan. 5, 2023

Related U.S. Application Data

(60) Provisional application No. 62/948,599, filed on Dec. 16, 2019.

(51) Int. Cl.
*H04B 7/185* (2006.01)

(52) U.S. Cl.
CPC ...... *H04B 7/18513* (2013.01); *H04B 7/18515* (2013.01); *H04B 7/18517* (2013.01); *H04B 7/1858* (2013.01); *H04B 7/18584* (2013.01)

(58) Field of Classification Search
CPC ............ H04B 7/18513; H04B 7/18515; H04B 7/18517; H04B 7/1858; H04B 7/18584
(Continued)

(56) References Cited

U.S. PATENT DOCUMENTS 5,233,626 A 8/1993 Ames
6,111,910 A 8/2000 Cui et al.
(Continued)

FOREIGN PATENT DOCUMENTS

CN 104424158 A 3/2015

OTHER PUBLICATIONS

International Search Report and Written Opinion dated Apr. 21, 2021 in PCT/US2020/065358.
(Continued)

*Primary Examiner* — Tan H Trinh
(74) *Attorney, Agent, or Firm* — Procopio, Cory, Hargreaves & Savitch LLP

(57) ABSTRACT

Embodiments of systems and methods for managing channel bandwidth of signals are provided herein. Example method include receiving signals from one or more antenna feeds, each signal having a first bandwidth. Some example methods include, in a plurality of processing blocks operating in parallel in one or more processors, performing one or more channelizer operations on portions of the signals, each channelizer operation creates a plurality of channels having a bandwidth smaller than the first bandwidth. Some methods may include, in a plurality of processing blocks in the one or more processors, performing one or more combiner operations on the channels, each operation combines the
(Continued)

bandwidth of a subset of the channels into a combined channel, the plurality of processing blocks operating in parallel. The method then outputs the combined channel to a network.

12 Claims, 10 Drawing Sheets

(58) Field of Classification Search
USPC ........................................................ 455/12.1
See application file for complete search history.

(56) References Cited

U.S. PATENT DOCUMENTS

| | | | |
|---|---|---|---|
| 6,781,968 | B1 | 8/2004 | Colella |
| 8,953,698 | B2 | 2/2015 | Lindoff et al. |
| 9,148,327 | B1 | 9/2015 | Harris |
| 11,552,737 | B1 | 1/2023 | Shattil |
| 2003/0142726 | A1 | 7/2003 | Eltawil et al. |
| 2004/0264454 | A1 | 12/2004 | Rajkumar et al. |
| 2005/0078649 | A1 | 4/2005 | Tehrani et al. |
| 2006/0291599 | A1* | 12/2006 | Strodtbeck ............... H04L 1/06 375/347 |
| 2007/0019750 | A1 | 1/2007 | Gaikwad et al. |
| 2008/0159123 | A1 | 7/2008 | Tehrani et al. |
| 2009/0041167 | A1 | 2/2009 | Kadota et al. |
| 2011/0002366 | A1 | 1/2011 | Michaels et al. |
| 2011/0222584 | A1 | 9/2011 | Michaels |
| 2012/0069941 | A1 | 3/2012 | Herbig |
| 2013/0006601 | A1 | 1/2013 | Mlinarsky et al. |
| 2013/0115903 | A1 | 5/2013 | Kroeger et al. |
| 2014/0273815 | A1 | 9/2014 | Jayasimha |
| 2015/0229386 | A1* | 8/2015 | Lange ............... H04B 7/15507 370/317 |
| 2017/0169833 | A1 | 6/2017 | Lecomte |
| 2018/0248676 | A1 | 8/2018 | Raggio et al. |

OTHER PUBLICATIONS

Office Action dated Jul. 17, 2023 in U.S. Appl. No. 17/332,349.
Notice of Allowance dated Aug. 28, 2023 in U.S. Appl. No. 17/332,349.
Office Action dated Dec. 1, 2023 in Australian Patent Application No. 2019401924.
Office Action dated Nov. 15, 2023 in Canadian Patent Application No. 3,161,824.
Barros, G. et al. "A Soft-Handover Scheme for LEO Satellite Networks", 2013 IEEE 78th Vehicular Technology Conference (VTC Fall), Sep. 2, 2013, pp. 1-5.
Office Action dated May 28, 2024 in U.S. Appl. No. 17/332,285.
Thread_Block_2021 (Thread block (CUDA programming, downloaded from Wikipedia archive data Mar. 3, 2021). (Year: 2021).
Office Action dated May 29, 2024 in U.S. Appl. No. 17/332,675.
Office Action dated Aug. 23, 2024 in U.S. Appl. No. 17/332,285.
Office Action dated Jul. 30, 2024 in Japanese Patent Application No. 2022-535769.
Faulkner et al., A reconfigurable wideband streaming channeliser for RF sensing applications: A multiple GPU-based implementation [online], 2017 11th International Conference on Signal Processing and Communication Systems (ICSPCS), Jan. 29, 2018.
Faulkner et al., GPU Synthesis of RF Channeliser Outputs for a Variable Bandwidth Microwave Digital Receiver, 2018 12th International Conference on Signal Processing and Communication Systems (ICSPCS), Feb. 3, 2019.

* cited by examiner

SYSTEM AND METHOD FOR MANAGING CHANNEL BANDWIDTH OF A COMMUNICATION SIGNAL

CROSS-REFERENCE TO RELATED APPLICATIONS

This application claims priority to U.S. Provisional Patent App. No. 62/948,599, filed on Dec. 16, 2019, which is hereby incorporated herein by reference as if set forth in full.

BACKGROUND

Technical Field

This disclosure relates to signal processing. More specifically, this disclosure relates to implementing distributed computing using a general-purpose processor to achieve high-rate processing.

Description of the Related Art

In some examples, a satellite communication signal can require large ground stations and other facilities to transmit and/or receive and process data locally. This can include extensive antenna arrays, associated radio frequency terminals (RFTs), and significant electronics (modems, signal processors, etc.) to receive, process, and use the data received from an associated satellite.

SUMMARY

This disclosure provides for an improved communication system. The following summary is not intended to define every aspect of the invention, and other features and advantages of the present disclosure will become apparent from the following detailed description, including the drawings. The present disclosure is intended to be related as a unified document, and it should be understood that all combinations of features described herein are contemplated, even if the combination of features are not found together in the same sentence, paragraph, or section of this disclosure. In addition, the disclosure includes, as an additional aspect, all embodiments of the invention narrower in scope in any way than the variations specifically mentioned herein.

As disclosed herein, digital signal processing (DSP) can be performed in many different ways using general purpose processors, or central processing units (CPUs). Example techniques executed on a general purpose processor to achieve high rate processing that can perform the disclosed functions include, but are not limited to:
- using multiple CPUs and the parallel processing on the many cores of each CPU;
- employing single instruction, multiple data (SIMD) techniques;
- feed-forward processing to break up feed-back loops;
- pre-calculation of metadata (or state information) to divide the heavy processing over several CPUs; and
- collection of multiple functions into a single function in a manner that increases CPU performance or lowers memory bandwidth utilization.

One way to increase through-put on a general-purpose CPU is to utilize as many cores as possible that exist on the CPU. Great care must be taken to ensure data is properly shared amongst several cores within the CPU but this allows for processing throughput to increase with the addition of more CPU cores. It is also possible to use several CPUs on the same system, with each CPU containing multiple cores. All embodiments within this disclosure take advantage of using multiple cores within a CPU, and some embodiments take advantage of having multiple CPUs per system and/or even groups of systems in a server environment.

Another way to achieve high processing rates is to take advantage of single instruction, multiple data (SIMD) capabilities of general-purpose CPUs. This allows a single CPU core to perform up 16 floating point operations on a single instruction, as is the case of AVX512 SIMD operations. One example of employing SIMD is using a finite impulse response (FIR) filter function in which 16 floating point results are calculated at once. Another example is when multiplying complex numbers together. Instead of calculating one pair of quadrature signals (IQ data), it is possible with AVX512 to calculate eight IQ pairs at a time. Complex multiplication is used in nearly every processing algorithm described in this disclosure. Other examples using SIMD includes the correlator in the diversity combiner, the decimation in the signal analyzer, and again adjustment in the channelizer/combiner.

Some processing systems implement various forms of feedback, often including a phase lock loop (PLL) or a delay lock loop (DLL). However, feedback in general as is the case for PLLs and DLLs can be problematic because the very nature of the feedback causes bottlenecking. The feedback loop forces all the incoming data to be processed on a single (e.g., linear) process that cannot not be easily spilt or otherwise divided. In addition to the feedback, there are other obstacles to overcome using PLLs and DLLs including how often to calculate the error term. The feedback loop can be replaced with a feed-forward loop in which error states can be processed on a block of data and then the calculated error term is fed-forward to another block which applies the error term. If proper overlap is used, the error calculation and application of that term can be split over several CPU cores to further increase through-put. One example of this is in the diversity combiner where the timing and phase correction is calculated in one block and the timing adjustment is applied in another block and the phase correction in yet another block. This method as a set can then be parallelized over several CPU cores to further increase through-put.

In addition to feed-forward approach to processing data, it can be beneficial to perform pre-calculation of metadata in a single block that then splits up the processing of the data over several CPU cores. This method is similar to the feed-forward methodology already discussed, but in this case, it is not breaking up a loop (such as feed-back loop) but simply leveraging many CPU cores to increase the amount of data that can be processed. In this way the block that performs the pre-calculation does not perform the CPU intensive processing but calculates the needed steps such as iterations within a for-loop and start indices and slope points between interpolation phases values. One such example of this is Doppler Compensation performed in the Diversity combiner. The needed phase adjustments are created in the first block but the CPU intensive calculation to perform the phase adjustment is handed off to subsequent blocks downstream. If the second portion of the processing is the CPU intensive portion, this allows for any number of CPU cores to be utilized and therefore increase processing rate that otherwise could not be achieved within a single block.

Another technique that can be employed on general purpose CPUs to achieve high through-put is the way the set of functions is employed and memory type used. In some cases, memory bandwidth becomes the limiting factor in performance. If this is the case, the goal is to limit the amount of data that needs to transferred to and from random-access memory (RAM) (not faster memory like CPU cache). In order to do this, functions need to be collapsed so that they all run together instead of individually with goal of accessing slower RAM as little as possible as compared to accessing faster CPU cache. Another method to lowering memory bandwidth is utilize properly space memory types, e.g., using int8 when possible versus floats or doubles.

In an embodiment, a method for managing channel bandwidth of one or more downlink signals is provided herein. The method comprises receiving the one or more downlink signals from one or more antenna feeds, the one or more downlink signals having a first bandwidth. The method also comprises, in a first one or more processing blocks in one or more processors, performing a first channelizer operation on a first portion of the one or more downlink signals that creates a first plurality of channels, each of the first plurality of channels having a bandwidth smaller than the first bandwidth. The method also includes, in a second one or more processing blocks in the one or more processors in parallel with the first one or more processing blocks, performing a second channelizer operation on a second portion of the one or more downlink signals that creates a second plurality of channels, each of the second plurality of channels having a bandwidth smaller than the first bandwidth. The method further includes, in a third one or more processing blocks in the one or more processors, performing a combiner operation that combines a subset of the first plurality of channels and a subset of the second plurality of channels into a combined channel, the combined channels having a second bandwidth smaller than the first bandwidth, and then outputting the combined channel to a network.

In another embodiment, another method is provided for managing channel bandwidth of one or more downlink signals is provided herein. The method comprises receiving the one or more downlink signals from one or more antenna feeds, the one or more downlink signals having a first bandwidth. The method also includes, in a first one or more processing blocks in one or more processors, performing a first channelizer operation on a first portion of the one or more downlink signals that creates a first plurality of channels, each of the first plurality of channels having a bandwidth smaller than the first bandwidth. Additionally, the method includes, in a second one or more processing blocks in the one or more processors in parallel with the first one or more processing blocks, performing a second channelizer operation on a second portion of the one or more downlink signals that creates a second plurality of channels, each of the second plurality of channels having a bandwidth smaller than the first bandwidth. The method then outputs the first and second plurality of channels to a network.

In another embodiment, another method is provided for managing channel bandwidth of one or more downlink signals. The method comprises receiving input signals of the one or more downlink signals on a plurality of input channels, each input channel having a spectral bandwidth, and, in a plurality of processing blocks in one or more processors, performing a combiner operation on the input channels that combines the spectral bandwidth of a selected subset of the plurality of input channels into a combined channel, the plurality of processing blocks operating in parallel. The method then outputs the combined channel to a network.

In another embodiment, systems are provided for or managing channel bandwidth one or more downlink signals. The systems comprise one or more antennas configured to receive the plurality of downlink signals a digitizer operable to convert a received analog signal into the digital bitstream and one or more processors communicatively coupled to the plurality of antennas. The one or more processors have a plurality of processing blocks and are operable to perform one or more of the methods described above.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Figure 1:
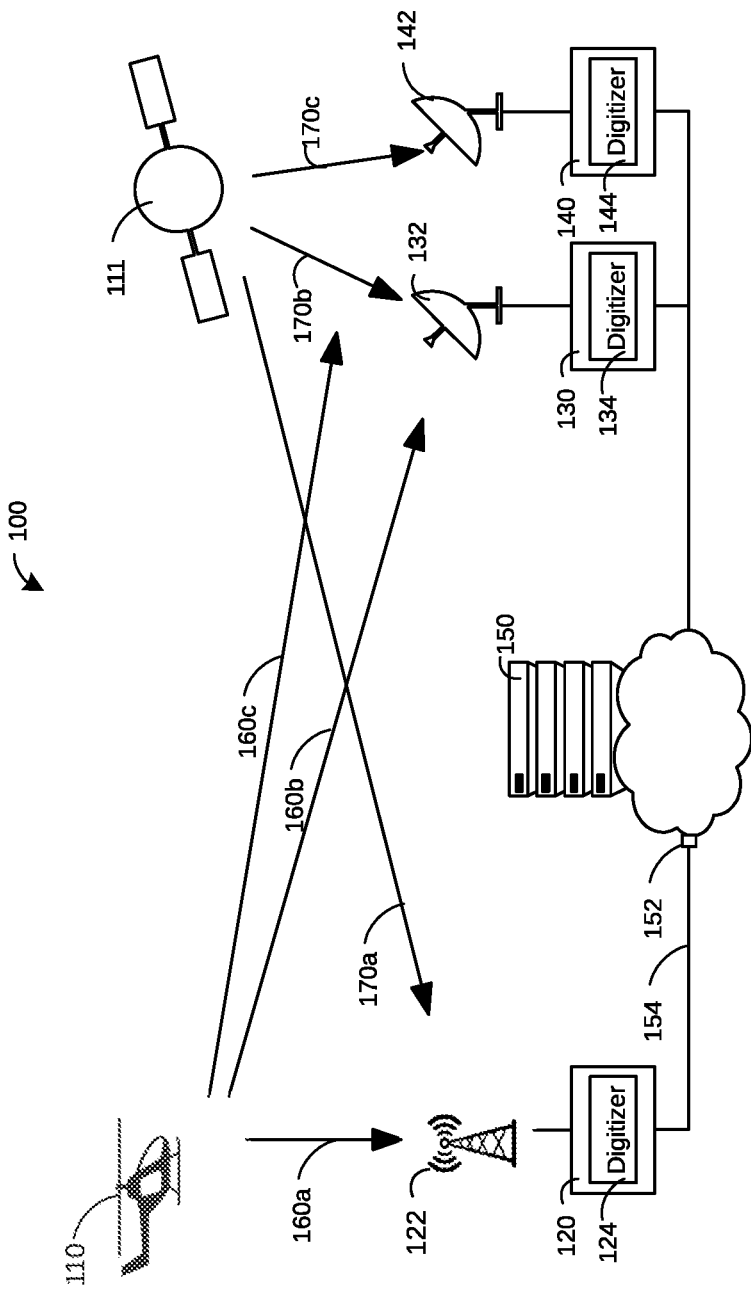
FIG. 1 is a graphical representation of an embodiment of a communication system, in accordance with the embodiments disclosed herein.

Embodiments of an improved communication system using a general-purpose processor to achieve high-rate processing are disclosed. Embodiments disclosed herein provide for improved communication systems capable of utilizing a general-purpose processor to efficiently achieve a high-rate of signal processing. After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

A communication system is used as a primary example throughout the description, however, the application of the disclosed methods is not so limited. For example, any wireless or radio communication system requiring the use of digital signal processing, a modem, etc. can implement the systems, methods, and computer readable media described herein.

This disclosure provides systems and methods for performing Digital Signal Processing using general purpose central processing units (CPUs) in either a standard server environment or a virtualized cloud environment. In some examples, the systems can employ single-instruction multiple data (SIMD) techniques to achieve high throughput including SSE, SSE2, SSE3, SSE4.1, SSE4.2, AVX, AVX2 and AVX512 instruction sets. This disclosure describes how the data processing is managed over multiple processing cores of the processors (e.g., CPUs) to achieve the necessary throughput without the use of dedicated signal processing hardware such as Field Programmable Gate Arrays (FPGAs) or High Performance Computing (HPC) hardware such as Graphics Processing Units (GPUs). The ability to perform this processing in general-purpose server CPUs, including but not limited to x86 architecture made by Intel and AMD micro-processors, as well as ARM processors like Cortex-A76, NEON and AWS Graviton and Graviton2, allows the functions to be deployed within a general-purpose cloud processing environment using a virtualized processing architecture without the need for dedicated hardware. The processing in general purpose CPUs is enabled by a Digital IF appliance that samples the analog signal and feeds the digitized samples into the CPU over an Ethernet connection. The Digital IF appliance can also accept digitized samples and covert to an analog signal, similar to that described in U.S. Pat. No. 9,577,936, issued Feb. 21, 2017, entitled "Packetized Radio Frequency Transport System" the contents of which are incorporated by reference in their entirety.

FIG. 1 is a graphical representation of an embodiment of a communication system. A communication system (system) 100 can have a platform 110 and a satellite 111 that communicate with a plurality of a ground stations. The platform 110 can be an aircraft (e.g., an airplane, helicopter, or unmanned aerial vehicle (UAV), etc.) A plurality of ground stations 120, 130, 140 can be associated with a terrestrial radiofrequency (RF) antenna 122 or one or more satellite antennas 132, 142. The ground station 120 can have an antenna 122 coupled to a digitizer 124. The digitizer 124 can have one or more analog to digital converters (A2D) for converting analog signals received at the antenna 122 into a digital bit stream for transmission via a network. The digitizer 124 can also include corresponding digital to analog converters (D2A) for operations on the uplink to the platform 110 and the satellite 111.

Similarly, the ground station 130 can have an antenna 132 and a digitizer 134, and the ground station 140 can have an antenna 142 and a digitizer 144.

The ground stations 120, 130, 140 can each receive downlink signals 160 (labeled 160a, 160b, 160c) from the platform 110 and the downlink signals 170 (labeled 170a, 170b, 170c) from the satellite 111 in a receive chain. The ground stations 120, 130, 140 can also transmit uplink signals via the respective antennas 122, 132, 142 in a transmit chain. The digitizers 124, 134, 144 can digitize the received downlink signals 160, 170 for transmission as a digital bit stream 152. The digital bit stream 134 can then be transmitted, via a network 154 to a cloud processing system.

In some examples, the ground stations 120, 130, 140 can process all of the data (e.g., contained in the downlink signals) locally, however this can be exceptionally expensive from a time, resource, and efficiency perspective. Therefore, in some embodiments, the downlink signals can be digitized and transmitted as the digital bit stream 152 to a remote signal processing server (SPS) 150. In some implementations, the SPS 150 can be positioned in a physical location, such as a data center located in an offsite facility that is accessible via a wide area network (WAN). Such a WAN can be the Internet, for example. The SPS 150 can demodulate the downlink signals from the digital bit stream 152 and output the data or information bits from the downlink signals. In some other implementations, the SPS 150 can use cloud computing or cloud processing to perform the signal processing and other methods described herein. The SPS 150 can also be referred to as a cloud server.

The SPS 150 can then provide the processed data to the user or sent to a different site. The data and information can be mission-dependent. In addition, the information contained in the data can be the main purpose of the satellite, including weather data, image data, and satellite communication (SATCOM) payload data. As noted above, SATCOM is used as a primary example herein, but any communication or signal processing system using DSP can implement the methods described herein.

In order to achieve high processing rates with software, a phase lock loop (PLL) or delay lock loop (DLL) approach can be problematic due to the feedback within the loop. The feedback loop forces all of the incoming data (e.g., the downlink signal 132) to be processed on a single (e.g., linear) process that cannot not be easily spilt or otherwise divided. In addition to the feedback, there are other obstacles to overcome using the PLL/DLL including, for example, how often to calculate the error term.

Figure 2:
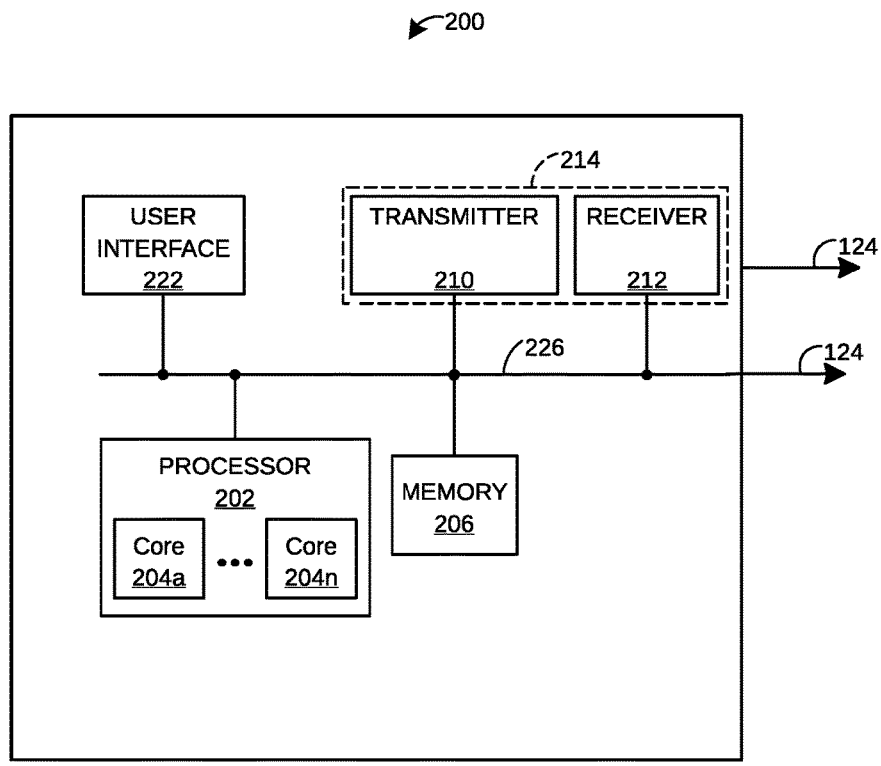
FIG. 2 is a functional block diagram of a wired or wireless communication device for use as one or more components of the system of FIG. 1.

FIG. 2 is a functional block diagram of a wired or wireless communication device for use as one or more components of the system of FIG. 1. A processing device (device) 200 may be implemented as, for example, the SPS 150 of FIG. 1. The device 200 can be implemented as needed to perform one or more of the signal processing methods or steps disclosed herein.

The device 200 may include a processor 202 which controls operation of the device 200. The processor 202 may also be referred to as a CPU. The processor 202 can direct and/or perform the functions, for example, attributed to SPS 150. Certain aspects of the device 200, including the processor 202 can be implemented as various cloud-based elements, such as cloud-based processing. Accordingly, the processor 202 can represent cloud processing, distributed over several disparate processors via a network (e.g., the Internet). Alternatively, certain components can be implemented in hardware. The processor 202 may be implemented with any combination of one or more of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processor 202 can have one or more cores 204 (shown as core 204a through core 204n) on which the computations can be performed. In implementations using cloud processing, the cores 204 can represent multiple iterations of distributed cloud processing. In some embodiments, using hardware, the processor 202 can be a complex, integrated circuit on which all the computations for the receiver are taking place. As used herein, the cores 204 can each be one processing element of the processor 202. The processor 202 can implement multiple cores 204 to perform the necessary parallel processing for the methods disclosed herein. In some embodiments, the processor 202 may be distributed across multiple CPUs as in cloud computing.

The device 200 may further include a memory 206 operably coupled to the processor 202. The memory 206 can be cloud-based storage or local hardware storage. The memory 206 can include both read-only memory (ROM) and random access memory (RAM), providing instructions and data to the processor 202. A portion of the memory 206 may also include non-volatile random access memory (NVRAM). The processor 202 typically performs logical and arithmetic operations based on program instructions stored within the memory 206. The instructions in the memory 206 may be executable to implement the methods described herein. The memory 206 can further include removable media or multiple distributed databases.

The memory 206 may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processor 202 or the one or more cores 204, cause the device 200 (e.g., the SPS 150) to perform the various functions described herein.

The device 200 may also include a transmitter 210 and a receiver 212 to allow transmission and reception of data between the communication device 200 and a remote location. Such communication can occur between the ground station 120 and the SPS 150 via the network 124, for example. Such communications can be wireless or conducted via wireline communications. The transmitter 210 and receiver 212 may be combined into a transceiver 214. The transceiver 214 can be communicatively coupled to the network 124. In some examples the transceiver 214 can include or be a portion of a network interface card (NIC).

The device 200 may further comprise a user interface 222. The user interface 222 may comprise a keypad, a microphone, a speaker, and/or a display. The user interface 222 may include any element or component that conveys information to a user of the device 200 and/or receives input from the user.

The various components of the device 200 described herein may be coupled together by a bus system 226. The bus system 226 may include a data bus, for example, as well as a power bus, a control signal bus, and a status signal bus in addition to the data bus. In some embodiments, the bus system 226 can be communicatively coupled to the network 124. The network 124 can provide a communication link between the device 200 (e.g., the processor 202) and the ground station 120, for example. Those of skill in the art will appreciate the components of the device 200 may be coupled together or accept or provide inputs to each other using some other mechanism such as a local- or wide area network for distributed processing.

Figure 3:
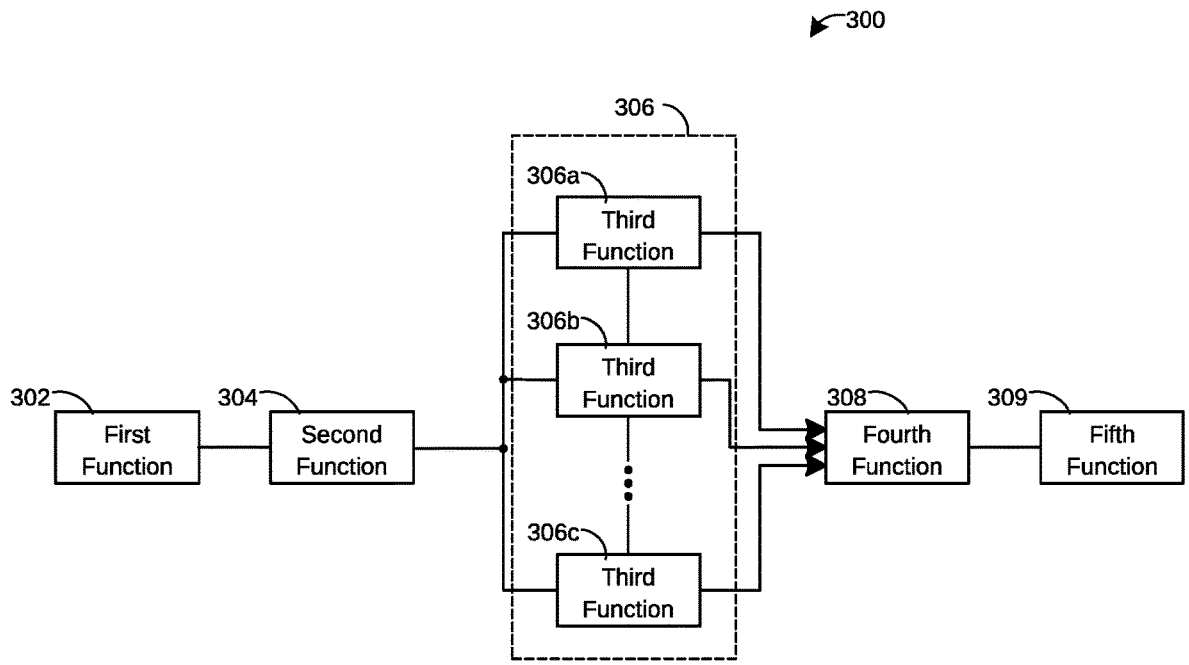
FIG. 3 is a graphical depiction of an embodiment of feedforward or pre-calculation signal processing, in accordance with embodiments disclosed herein.

FIG. 3 is a graphical depiction of schematic block diagram of an embodiment of feedforward or pre-calculation signal processing 300. A method 300 can occur as a generalized process incorporating a plurality of functions by, for example, the processor 202. The processor 202 can perform the plurality of functions in a series or in parallel arrangement as shown to perform one or more desired processes. Each function may refer to a block or collection of instructions or software executable by the processor 202 and stored in a memory 206.

A first function 302 can be performed by the processor 202. In some embodiments, a second function 304 can be performed serially, following the first function 302. Accordingly, the processor 202 can split blocks of data with the different functionality for processing over multiple cores 204 to perform the first function 302 and the second function 304.

The processor 202 can perform distributed processing of a third function 306 (shown as 306a, 306b . . . 306n) in parallel, following the second function 304. The parallel processing of the third function 306 can include, for example, splitting blocks of data associated with the same functionality over several cores 204 (e.g., processing blocks) of the processor 202. For example, "blocks of data" can mean a group of samples that need to be processed.

The processor 202 can then perform a fourth function 308, and a fifth function 309 in series. Similar to the first function 302 and the second function 304, the serial performance of the fourth function 308 and the fifth function 309 can include splitting blocks of data associated with the different functionality for processing over multiple cores 204. In general, each of the first function 302, the second function 304, the third function 306, the fourth function 308, and the fifth function 309 can each be performed in a different processing block. As used herein, a processing block can refer to a specific task performed on a block of data. The processing block can be associated with one or more of the cores 204, for example.

Therefore, the method 300 can split blocks of data with the same functionality to process over multiple cores 204, for example. Similarly, the method 300 can split blocks of data with different functionality to process over multiple cores 204.

In some other implementations of the method 300, the same processing blocks (e.g., the cores 204) can perform processing of data with single instruction, multiple data (SIMD), irrespective of the same or different functionality.

In other implementations, the embodiments of the method 300 can support processing blocks of data with minimal state information by using overlapping data. As used herein, state information can include variables needed during feedback (e.g., feedback processing)), data frame boundaries, etc. For example, in the case of feedback loops, state information can include the variables calculated within the loop that are needed during feedback in processing a continuous stream of data. State information can also include the location of a frame boundary within a data stream. Other examples can include things such as FIR filters where the state information includes values stored in buffers (e.g., possibly many delay elements) that are needed to keep continuous data flowing.

By ignoring state information and overlapping portions of adjacent blocks of data, processes can take advantage of parallel processing, using a variable level of overlap amongst the blocks of data.

Figure 4:
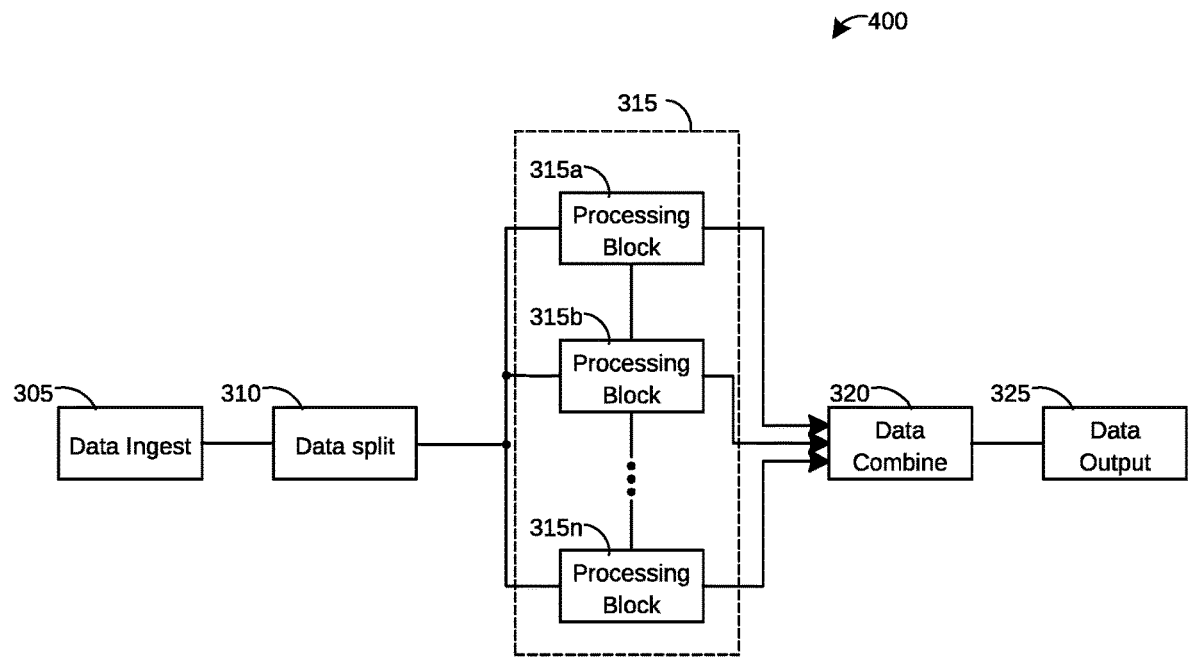
FIG. 4 is a graphical depiction of another embodiment of feedforward or pre-calculation signal processing of FIG. 3, in accordance with embodiments disclosed herein.

FIG. 4 is a graphical depiction of an embodiment of a method for feedforward or pre-calculation signal processing of FIG. 3. A method 400 can use the principles of the method 300 for series-parallel and/or parallel-series processing for multiple functions. In one example, the first function 302 (FIG. 3) can be a data ingest function 305, in which the processor 202 receives data for processing. The second function 304 (FIG. 3) can be a data split function 310, in which the processor 202 can parse data in overlapping blocks of data. The overlapped blocks of data can then be processed in parallel in various, parallel iterations of the third function 306a-306n as processing blocks 315a-315n. The overlap in the blocks of data can provide a level of redundancy that is not heavily reliant (or not reliant at all) on state information. The less state information that is needed, the easier it is to process the blocks of data in parallel as opposed to a continuous stream.

The method 400 can further include a data combine function 320, similar to the fourth function 308 (FIG. 3), combining the processed data, and a data output function 325, similar to the fifth function 309 (FIG. 3).

In a further example, the adjustable series-parallel or parallel-series arrangement of the various functions of the method 300 provide several methods of implementing feedforward processing to replace feedback loops. This is advantageous as it can increase throughput and avoid bottlenecks caused by delays in feedback processing.

An additional advantage of the series-parallel or parallel-series processing provided by the method 300 and the method 400, is that arranging one or more of desired algorithms within a processing block (e.g., one of the five processing blocks of the method 300), allows the processor 202 to distribute the processing load (e.g., across multiple cores 204) without concern for the speed of a given algorithm within a processing block (e.g., core 204). Thus, each core 204 shares the exact same processing load and eliminates bottle necking issues caused by individual algorithms.

An additional benefit of embodiments of the method 300 can include customizing a specific order of algorithms (e.g., processing blocks) to lower the computational burden within the processor 202. As described below, the overall, multi-stage processing of a given process may be agnostic to the order of multiple sub-processes. Therefore, in some examples, ordering the fourth function 308 may have certain advantages if performed prior to the third function 306.

The method 300 can further implement different variable types for memory bandwidth optimization, such as int8, int16 and floats, for example. This can accelerate certain algorithms (e.g., based on type). In addition, this can provide increased flexibility to maximize memory bandwidth.

Figure 5:
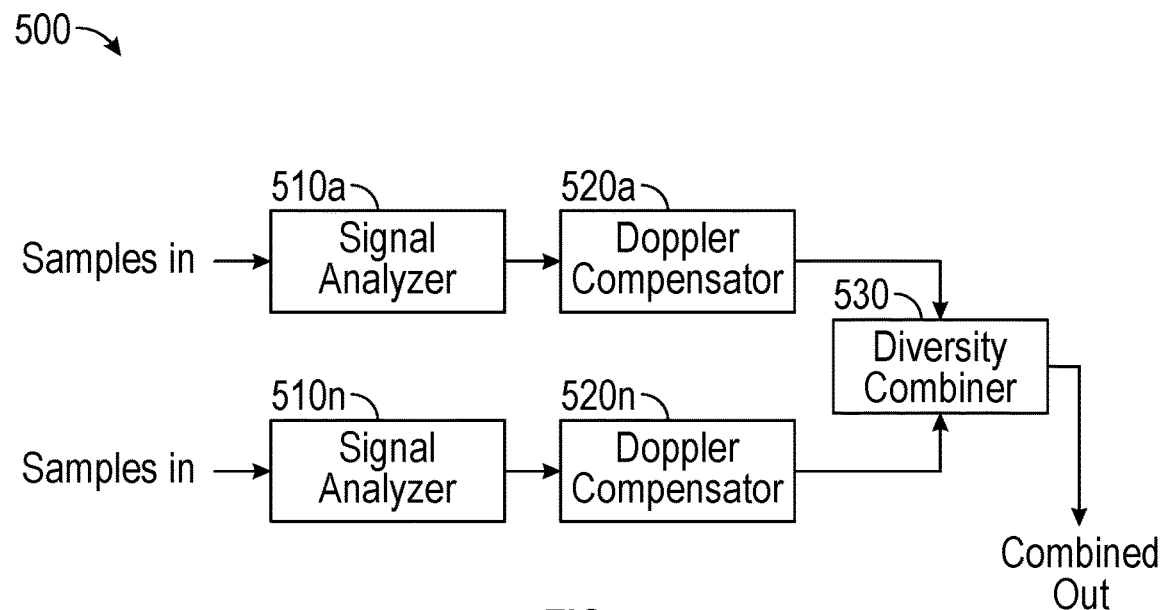
FIG. 5 is a functional block diagram of an embodiment of a digital signal diversity combiner, in accordance with embodiments disclosed herein.

FIG. 5 is a functional block diagram of an embodiment of a digital signal diversity combiner. A method 500 for diversity combining can include feedforward block processing as described above. The method 500 comprises a plurality of blocks. In some example, each block may represent a processing block and perform functions in a similar manner as the processing blocks 315a, 315b . . . 315n (FIG. 4), etc. In another example, a plurality of blocks can be grouped together as a single "processing block" that perform functions in a similar manner as the processing blocks 315a, 315b . . . 315n (FIG. 4), etc.

Figure 13:
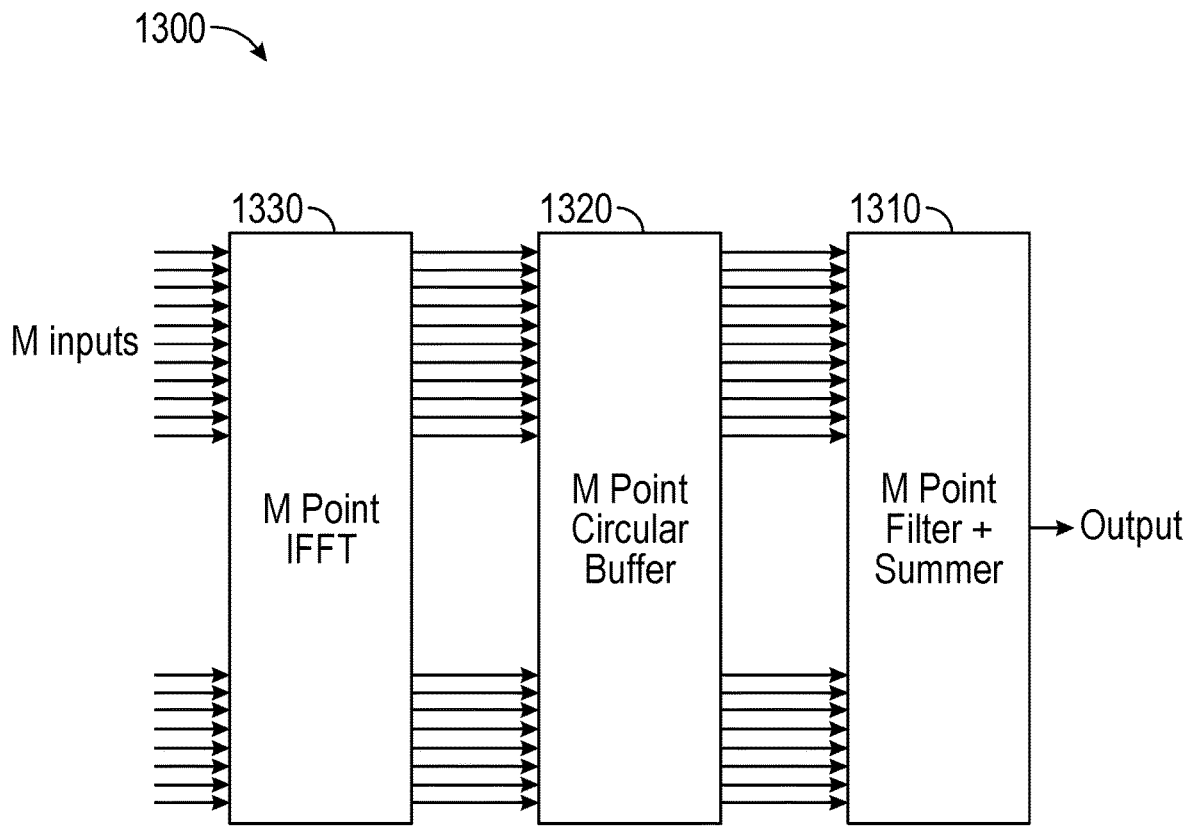
FIG. 13 is a functional block diagram of an embodiment of a digital signal combiner, in accordance with embodiments disclosed herein.
Figure 14A:
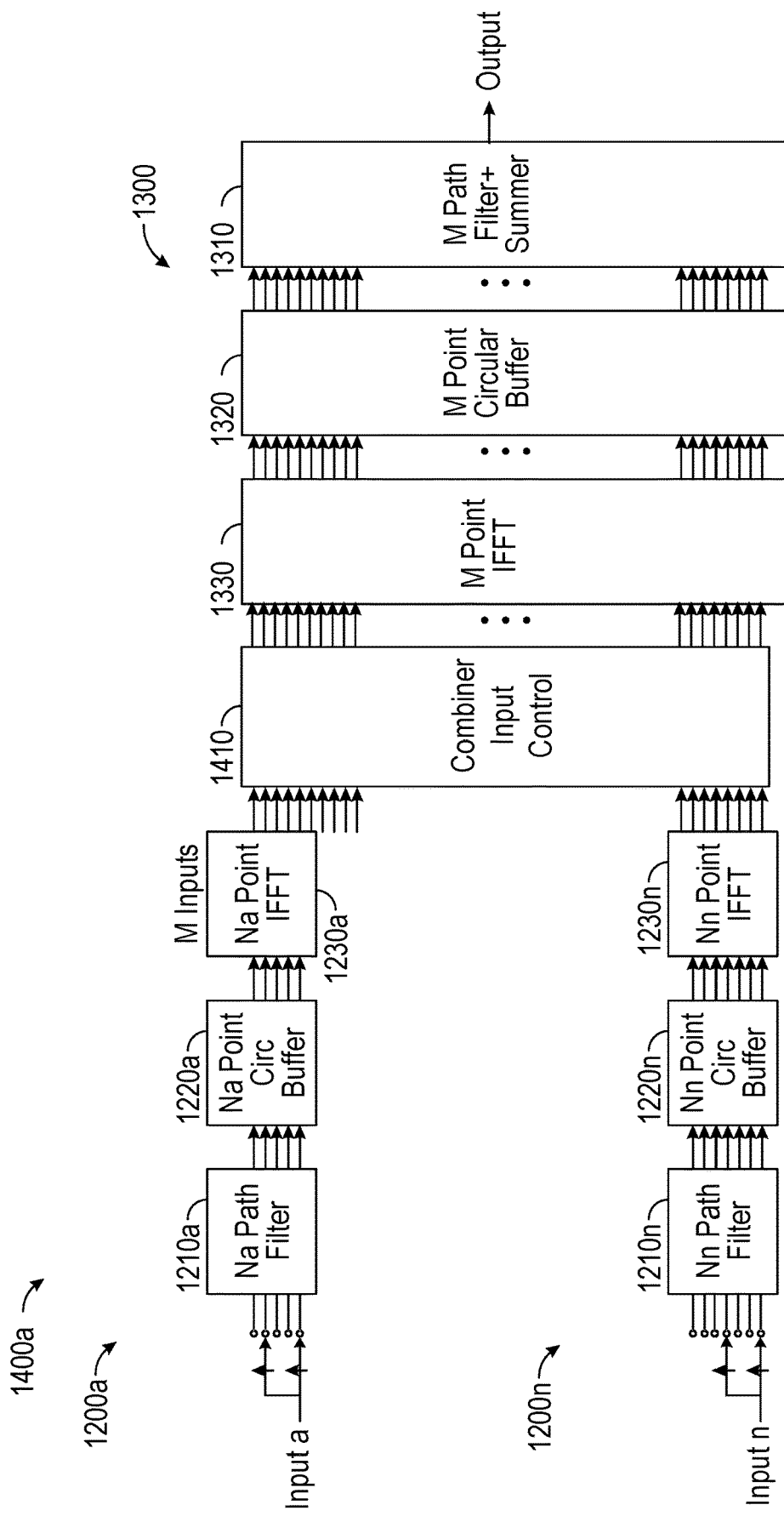
FIGS. 14A and 14B are a functional block diagrams of embodiments of digital signal channelizer(s) and combiner (s), in accordance with embodiments disclosed herein.
Figure 14B:
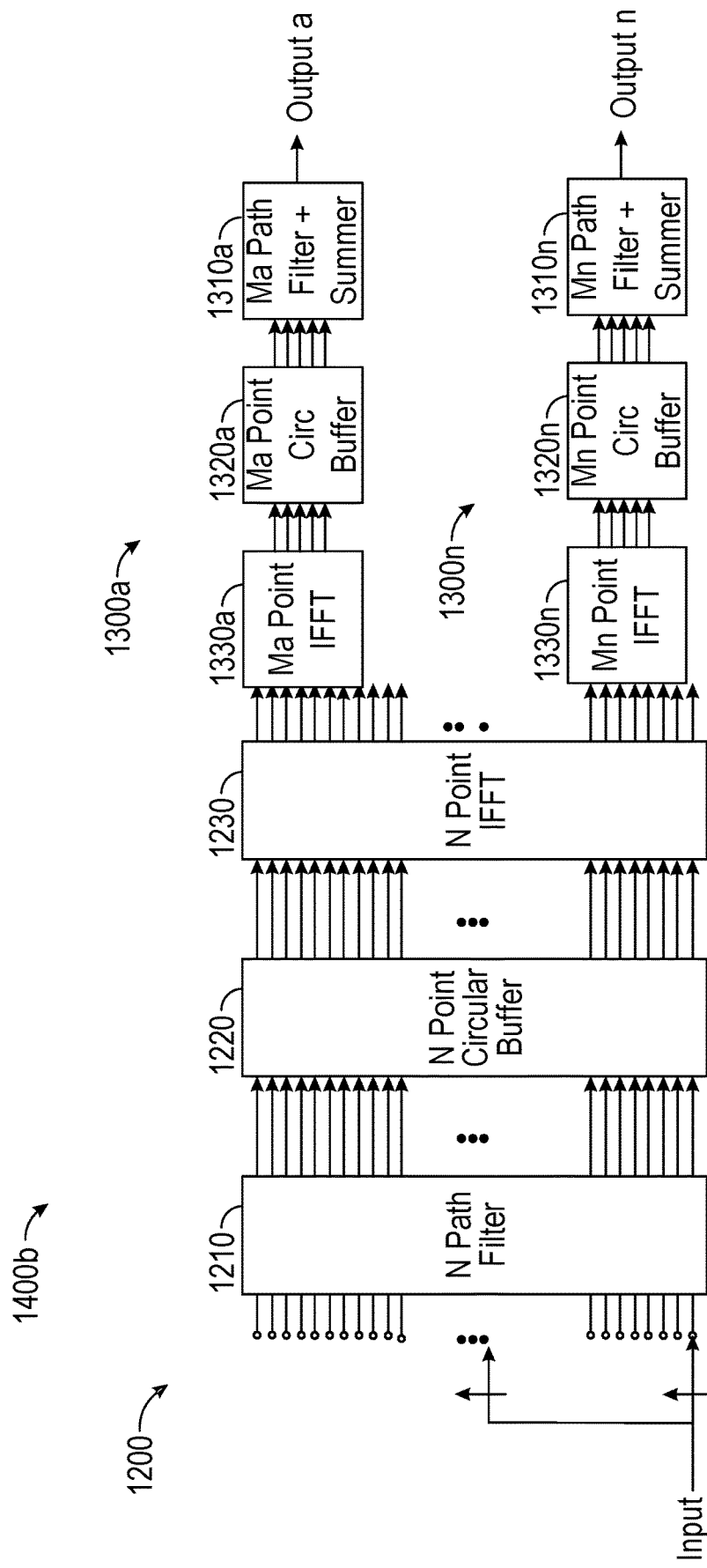
Figure 15:
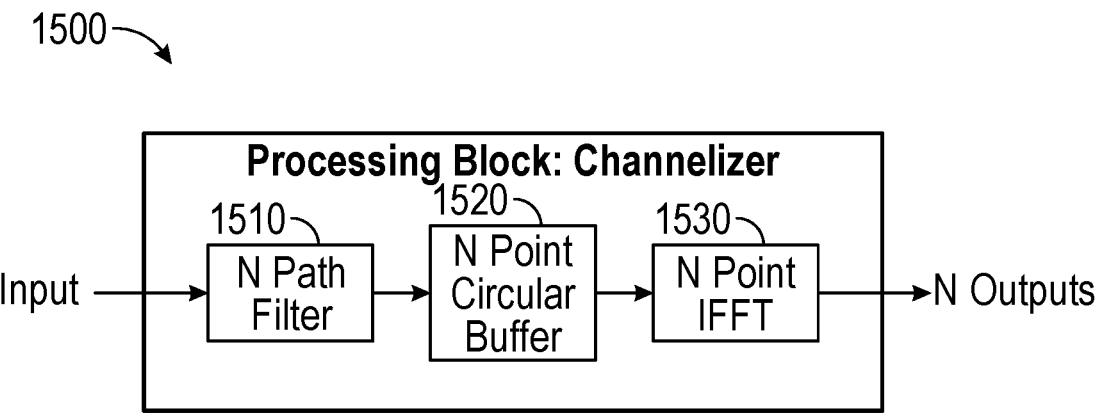
FIG. 15 is a functional block diagram of an example processing block for the digital signal channelizer of FIG. 12, in accordance with embodiments disclosed herein.
Figure 16:
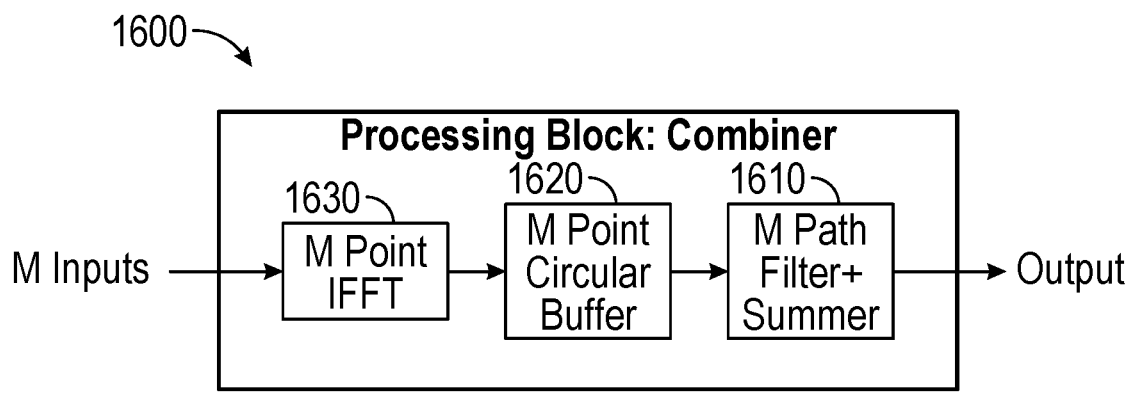
FIG. 16 is a functional block diagram of an example processing block for the digital signal combiner of FIG. 13, in accordance with embodiments disclosed herein.

FIGS. 12-16 are functional block diagrams of various embodiments of a channelizer and combiner. The methods illustrated in FIGS. 12-14B depict example processes including a pre-calculation signal processing. As with the method 500, one or more of methods 1200, 1300, 1400a, 1400b, 1500, and/or 1600 can comprise a plurality of processing blocks. In some examples, each block may represent a processing block and perform functions in a similar manner as the processing blocks 315a, 315b . . . 315n (FIG. 4), etc. In another example, a plurality of blocks can be grouped together as a single "processing block" that perform functions in a similar manner as the processing blocks 315a, 315b . . . 315n (e.g., FIG. 4), etc. For example, FIG. 15 graphically depicts an example processing block implemented as a channelizer processing block 1500 and FIG. 16 graphically depicts an example pre-calculation processing block implemented as a combiner processing block 1600. The sub-elements or blocks of block 1500 may be executed individually as shown in FIG. 15 or combined into a single block. Similarly, the sub-elements or blocks of block 1600 may be executed individually as shown in FIG. 16 or combined into a single block.

At block 305, the SPS 150 can ingest or otherwise receive the digital bit stream 134 (e.g., via the network 124). The data ingest at block 305 can receive the digital bit stream 134 data from a network connection (e.g., Ethernet).

At block 310, the data can be split into parallel data streams by a data splitter. In some embodiments, the processor 202 can perform data splitting functions required in block 310. In some other embodiments, a separate data splitting component (e.g., a data splitter) can be included in the device 200 (FIG. 2). Splitting the data into multiple parallel streams can allow parallel processing of the downlink signal 132. The method 300 can therefore take advantage of feedforward or pre-calculation processing to allow the incoming digitized signal data to be broken into smaller pieces and then processed on multiple cores 204. The digital bit stream 134 can be split to form overlapping packets in in-phase/quadrature (I/Q) pairs. In some embodiments, the "overlapping packets" can include data packets in which successive packets are overlapped with adjacent data packets. In some embodiments the data packets may all be the same length, but overlapped. The overlap in data packets can be at the beginning of the data packet or at the end. In addition, a data packet can overlap with both the preceding and the following data packets. The data packets can also have different lengths (e.g., varying amounts of data). Therefore, a first packet sent to the processing block 315a may overlap or otherwise repeat certain data of a second packet sent to the processing block 315b.

The amount of overlap between packets, or overlap size can be programmable and set as needed. In some examples, the overlap can be set to one percent (1%) of the packet size. This overlap size can be increased or decreased depending on need. For example, one particular parameter that can impact the overlap size is the uncertainty of the symbol rate in the data stream 134. For most signals, the worst case uncertainty is less than 1%, so a 1% covers most cases. In some other embodiments, the overlap can be 2%, 3%, 4%, 5%, 6%, 7%, 8%, 9%, or as high as 10%, or anywhere in between, as needed. It is also possible to have less than 1% overlap as well. The overlap could be 0.1% or lower if the data rate uncertainty is less than 0.1%.

The processor 202 can implement single instruction, multiple data (SIMD) processing on the digital bit stream 134. In some examples, SIMD can include Advanced Vector Extensions using 512 bits (AVX-512) allowing 16 floating point operations on a single CPU core on a single CPU instruction. AVX-512, for example, can process enormous amounts of data with the CPU (e.g., the CPU 202). For example, the processor 202 (and the device 200) can receive a 500 MHZ bandwidth data stream. 500 MHz of bandwidth is significant in some respects because that is a generally accepted practical limit of a 10 Gigabit Ethernet link. Sampling the data at 500 MHz, with 8 bits samples for an I/Q pair and including parity bits, can saturate a 10 Gbit Ethernet link. The 500 MHz example is not limiting on the disclosure. Data pipes larger than a 10 Gbit Ethernet link are possible. In addition, the processing can be split into n-number of parallel blocks (e.g., block 315) to accommodate any amount of data.

Block 315 is shown in dashed lines and depicts a processing step of the method 300. Block 315 is shown in multiple, parallel steps, or block 315a, 315b through 315n. The term "parallel" is used herein to describe that processing occurs in the processing blocks 315a-315n concurrently, or at the same time. The packets being processed may be of different lengths from one processing block 315 to another, so the processing of packets may have the same rate or speed from one processing block 315 to the next. As noted below, some of the processing blocks 315 may proceed faster or slower than others. Accordingly, the term parallel should not be limited to simultaneous or concurrent processing within the processing blocks 315.

The processing blocks 315 as used herein, can refer to a collection of processing functions performed by the processor 202, for example. The digital bit stream 134 can be sent into multiple parallel processing blocks 315a, 315b . . . 315n to spread the processing load across several cores 204. Individual processing blocks 315a, 315b . . . 315n can represent individual iterations of cloud processing. Thus, the processing of each of the processing blocks 315a-315n can be associated with a (cloud-based) core 204a-204n. The number of processing blocks 315 needed varies based on the amount of data being processed. In some embodiments, the number of processing blocks 315 can be limited by the number of logical cores available via the network 154 or, for local hardware processing, within the processor 202. In some other embodiments, memory bandwidth constraints can cause a bottle neck in the signal processing. Memory bandwidth can refer to the rate at which data can be read from or stored into a semiconductor memory (e.g., the memory 206) by a processor (e.g., the processor 202).

In some embodiments, the number of processing blocks 315 can vary. In general, the fewer processing blocks 315 present, the better to limit the number of cores needed for the entire process. This can further enable the system to fit into smaller virtual private cloud (VPC) machines which are cheaper to operate. A VPC can include the SPS 150 having several CPUs, for example. In some embodiments, 8 processing blocks 315 can be used for a 10 Gbit Ethernet link. Such an embodiment may not include forward error correction processing blocks. In some other embodiments, the only practical limitation on the number of processing blocks 315 needed is the bitrate and bandwidth of the communication link (e.g., size of the pipe). Accordingly, any number (n) of processing blocks 315 is possible. In some embodiments, however a practical limitation on the number (n) processing blocks 315 may be present based on the number of threads that can be run on a CPU or the number of cores 204 in the processor 202. However, if the limits are reached within a single CPU, multiple CPUs (e.g., the processor 202) together within the SPS 150 (e.g., a VPC) and have, an unlimited number of cloud-based CPUs or cores 204 to perform the processing. In addition, the processor 202 can create new processing block 315 as needed. The processing cores 204 can be spread across multiple distributed processors (e.g., the processor 202) as needed for throughput and efficiency.

The processing blocks 315 are arranged in such a way that it does not matter which processing block 315a, 315b . . . 315n are performed the slowest (or fastest). The method 300 can share the processing load across the processing blocks 315 and therefore alleviate any processing delays caused by bottle necking issues at individual processing blocks 315. For example, individual subprocesses of the processing blocks 315 (see description of FIG. 4, below) may not be performed or occur at equal rates (e.g., some are faster than others). Accordingly, larger process of the method 400 (FIG. 4), for example, can account for variations in performance or processing times. The processing blocks 315 can then be created as many times as needed to handle the incoming data.

In some embodiments, each processing block 315 can represent a collection of signal processing algorithms performed by the processor 202. As used herein, an algorithm can refer to the smallest collection of functions or method steps that perform a desired function. Multiple exemplary algorithms are described herein.

An exemplary benefit of the method 300 is the ability to create more processing blocks 315 when needed. In general, the processing blocks 315 can be implemented in software, and so can be created or eliminated as needed to suit a given data rate or processing load. Each processing block 315 can be rearranged to fit the needs of different received waveforms (e.g., the downlink signal 132) and the associated digital bit streams 134.

At block 320 the processed signal data from the multiple processing blocks 315 can be recombined to form the original data encoded and modulated on the downlink signal 134. In some embodiments, the processor 202 can perform the functions of a data recombiner. In other embodiments, the device 200 can have an additional component to perform such functions. Each data packet or processed block of data can have a time stamp. The data recombiner (e.g., the processor 202) can order the data blocks based on the time stamps and compare the phase between the ordered blocks. The recombiner can further adjust the phase of adjacent blocks reorder the data stream. In some embodiments, the phase of a subsequent data block can be adjusted to match the phase of a previous data block.

For all processing blocks shown 315, there are at least four options for running:
1) Multiple blocks running, with each sub-element (e.g., each block 315a-315n) within the processing block 315 getting its own core (e.g., cores 204a-204n);
2) Multiple blocks running, with the processing block 315 getting just one dedicated core for the entire block;
3) Single Block running with each sub-element within the processing block getting its own core; and
4) Single Block running with the processing block getting just 1 dedicated core for the entire block.

The more cores that can be run, the higher the rates that may be achievable.

At block 325, the device 200 can output the data to an appropriate receiver. In some examples such a receiver can be one or more mission operations centers. This data can be mission dependent (e.g., the purpose of the satellite), and can include, among other things, weather data, image data, and SATCOM payload data.

In a general-purpose CPUs, there are at least three main factors that may limit high rate performance: 1) Data ingest, 2) CPU capacity, and 3) memory bandwidth utilization. Data Ingest refers to how fast data can be fed into the CPU. CPU capacity is driven the CPU clock speed and the number of cores within the CPU. Memory bandwidth refers to how quickly data can be transferred to/from the CPU to external DDR RAM (not CPU cache). Memory bandwidth may be determined by the number of memory lanes and the DDR RAM clock speed. In certain cases, the limiting factor for achieving high rate processing is CPU capacity but it in other cases it is memory bandwidth. Care must be taken to determine which of the above cases is impacting the performance and if it is memory bandwidth limited, the embodiments described below are non-limiting examples of ways to lower the memory bandwidth utilization within the proposed patent approach.

Function calls within a given processing block can be arranged in such a manner optimize CPU computation or memory bandwidth utilization. For example, referring to function calls (illustratively depicted as blocks) shown in FIG. 10, for the given example, the various functions calls (e.g., raise to N power block, mixing block, and decimation block) can be grouped in such a way to minimize memory bandwidth. These functions calls can be called independently so that each function is completed on a set of data before another function starts, so to simplify each function. In another example, a plurality of or all of the function calls can be combined into one block, such that data is not transferred to RAM after each executed function and the memory bandwidth for the combined function is much smaller then called independently. In the case of independently called functions, a first function call (e.g., the raise to N power) may be performed over the whole data set before a second function call (e.g. the mixing block) would occur. In the case of combining, just a portion of data would be processed in the first function call before the second is executed. In this way, memory bandwidth drops. This method can apply to any grouping of functions, not just those illustrated in FIG. 10. For example, the method may be applied to the timing and phase error calculation shown in FIG. 11 or any other grouping for function calls to be executed in a processing block as disclosed herein (e.g., the various function call blocks illustrated in FIGS. 7-16).

Another way to improve memory bandwidth utilization may be to collapse several function call blocks into one block similar to the approach described above. For example, for a channelizer, three main functions may be necessary to separate one channel to N channels: 1) a finite impulse response (FIR) filter, 2) a Circular Buffer, and 3) an Inverse fast Fourier transform (IFFT). For a combiner, three main functions may be necessary to combine M channels into one c: 1) an IFFT, 2) a Circular Buffer, and 3) a finite impulse response (FIR) filter. Normally, for ease of operation and CPU optimization, each function would require its own block as shown in FIGS. 15 and 16, but to lower memory bandwidth utilization, all functions can be combined into one block. This tradeoff lowers memory bandwidth utilization for a hit in CPU performance.

Example Embodiment of Diversity Combiner with Blind Detection and Doppler Compensation Running on General Purpose CPUs Employing Parallel Processing on Multiple Cores to Achieve High-Throughput Operating in a Cloud Environment As described above, FIG. 5 is a functional block diagram of an embodiment of a method 500. In an example, the method 500 may be referred to as Diversity Combiner with Blind Detection and Doppler Compensation method 500. Diversity combining may be used to combine multiple antenna feeds together such that the signals are aligned in time and phase, and each are weighted based on signal quality to optimize information transfer of the multiple channels. Signal quality may be determined using, for example but not limited to, one or more of signal-to-noise ratio, energy per symbol to noise power spectral density (Es/No), power estimates, received signal strength indicators (RSSI), and the like. The multiple antenna feeds can be from one or more remote locations, such as the platform 110 or the satellite 111. Satellites are used as an example herein, but other wireless transmission systems may be implemented such as radio antennas (e.g., the antenna 122) or other type of transmitter. Accordingly, the use of a satellite is not limiting on this disclosure.

In the case of a satellite as shown in FIG. 1, diversity combining can also be used during an antenna handover event when the platform 110 and the satellite 111 are visible from the same ground station (e.g., the ground station 122) but, for example, the satellite 111 is falling below the horizon (e.g., in the east) and the platform 110 is rising over the horizon (e.g., in the west). In order to properly combine the downlink signals, several calculations must be performed. The disclosed system can digitize and convert the signals into digital samples which are then transported to a signal processing element. The system can further compute and compensate for Doppler effects. The system can also determine the residual phase and frequency delta (e.g., difference) between the downlink signals as well as the time differential and the estimated signal-to-noise ratios of each channel. Following these operations, the signals are then combined together.

As described above, FIG. depicts a plurality of blocks that may each represent a processing block and may be implemented as one or more of the elements 306a, 306b, . . . 306c (FIG. 4) and/or as one or more of the processing blocks 315a, 315b . . . 315n (FIG. 4). In another example, a plurality of blocks shown in FIG. 5 can be grouped together as a single "processing block" that perform functions in a similar manner as the processing blocks 315a, 315b . . . 315n (FIG. 4) and/or elements 306a, 306b . . . 306c (FIG. 3).

The method 500 is illustratively shown in FIG. 5 at the highest level. The method 500 comprises a plurality of processing blocks, for example, one or more Signal Analyzer processing blocks 510a-510n (collectively referred to as Signal Analyzer processing block(s) 510 or processing block(s) 510), one or more Doppler Compensator processing block 520a-520n (collectively referred to as Doppler Compensator processing block(s) 520 or processing block(s) 520), and a Diversity Combiner processing block 530. In the illustrated example, a plurality of signal analyzer processing blocks 510a-510n and Doppler Compensator processing block 520a-520n are shown for executing functions on a plurality of signals, where each block is executed on a corresponding signal. Any number of signals are possible; however, the example herein will be described with reference to two signals.

Figure 6:
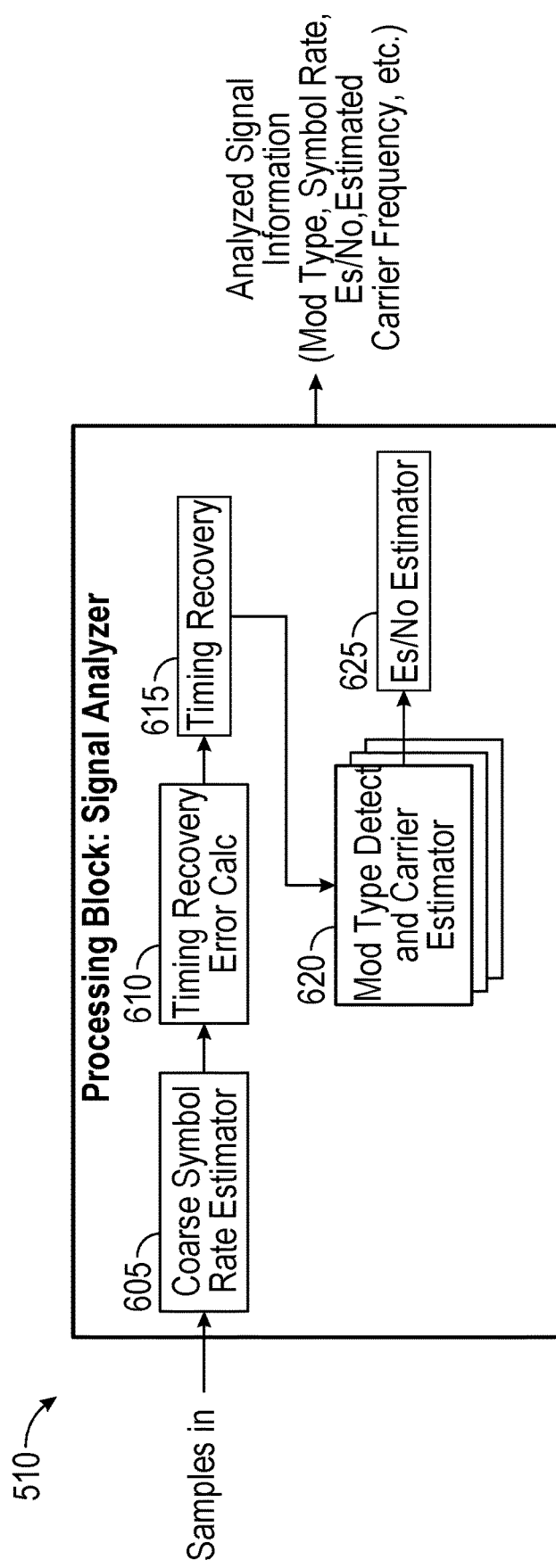
FIGS. 6-8 are functional block diagrams of example processing blocks included in the diversity combiner of FIG. 5, in accordance with embodiments disclosed herein.
Figure 7:
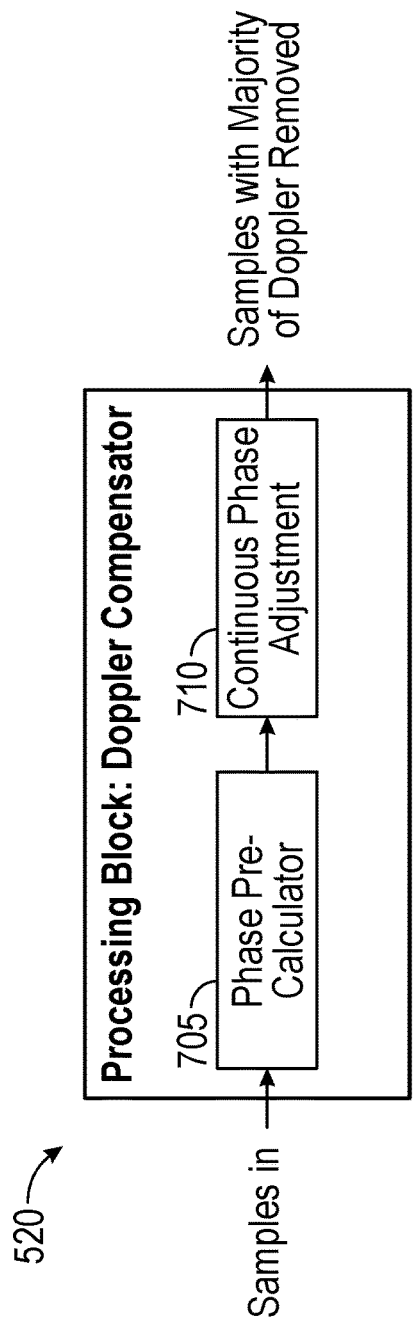
Figure 8:
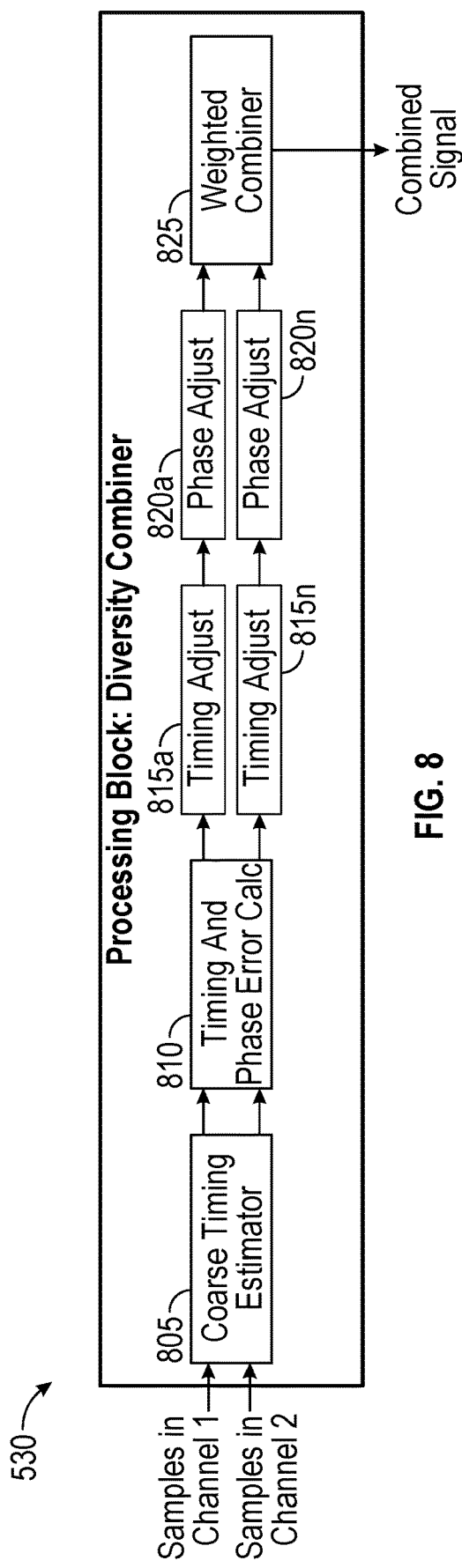

An example of the Signal Analyzer processing block 510 is graphically depicted in FIG. 6, an example of the Doppler Compensator processing block 520 is graphically depicted in FIG. 7, and an example of the Diversity Combiner processing block 530 is graphically depicted in FIG. 8. The method 300 and/or the method 400 may be used for processing of downlink signals 160, 170 (e.g., FIG. 1) for each of the processing blocks 510-530. One or more of the processing blocks 510, 520, and/or 530 may be implemented as the one or more of elements 306a-c in 306 of method 300 described in connection with FIG. 3, or one or more of elements 315a-n in 315 of method 315 described in connection with FIG. 4.

It is possible to execute each of processing blocks 510, 520, and 530 separately as well. One example would be to use only the diversity combiner processing block 530 in a case in which there is one transmitting satellite that has two independent downlink signals, such as a Right-Hand and Left-Hand Polarized outputs as opposed to the antenna handover case described earlier. In this case, the timing and Doppler effects can be ignored and therefore the Signal Analyzer processing block 510 and Doppler Compensator processing block 520 may not be required.

An example Signal Analyzer processing block 510 is shown in FIG. 6, which can be used for blind detection where the symbol rate, modulation type (referred to herein as "mod type"), and/or center frequency can each be estimated without any input from the user. The processing block 510 may comprise a plurality of sub-elements, such as for example, a Coarse Symbol Rate Estimator function block 605, a Timing Recovery Error Calculator function block 610, Mod Type and Carrier Estimator function block 620, and the (Es/No estimator function block 625. The processing block 510 may also comprise a Timing Recovery function block 615.

Figure 9:
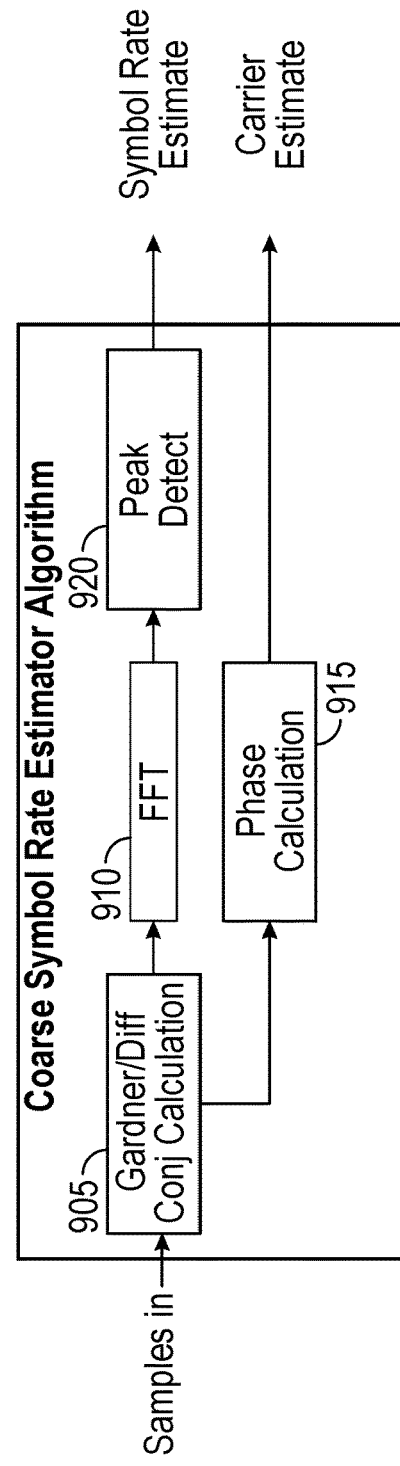
FIGS. 9 and 10 are functional block diagrams of example function blocks of the processing block of FIG. 6, in accordance with embodiments disclosed herein.

An example Coarse Symbol Rate Estimator function block 610 is graphically depicted in FIG. 9. The illustrated example of the function block 610 comprises a plurality of sub-elements or sub-function blocks 905-920. A first sub-function block 905 estimates a symbol rate, for example methods, using a Gardner calculation and/or executing a Diff Conjugate calculation. An example of the Gardner calculation is described in more detail in U.S. Pat. No. 10,790,920, the disclosure of which is hereby incorporated herein by reference as if set forth in full. An example of a Diff Conjugate is vector calculation where y[n]=a[n]*conj(a[n+1]); where n ranges from 0 to length of the input−1. In either calculation, the sub-function block 905 outputs an estimated symbol rate to sub-function block 910, where an FFT of the output of sub-function block 905 is taken and a max peak frequency detected at sub-function block 920. The detected max peak frequency corresponds to the symbol rate, the symbol rate can be estimated based on the detected max frequency. It is also possible, in various embodiments, to measure a coarse carrier estimate of the signal from the phase of Diff Conjugate calculation y[n] at the phase calculation function block 915.

Referring back to FIG. 6, examples of the Timing Recovery Error Calc 610 and Timing Recovery 615 are described in U.S. Pat. No. 10,790,920, the disclosure of which is hereby incorporated herein by reference as if set forth in full. For example, Gardner Timing Error Detector estimated in function block 605 can be applied to incoming data to create timing information, as is known in the art. In another embodiment, the incoming sample stream can be delayed by one sample. Then the non-delayed data can be multiplied by the conjugate (conjugate multiplication) of the delayed data. Both have advantages and drawbacks so it is an engineering tradeoff on which may be implemented.

Figure 10:
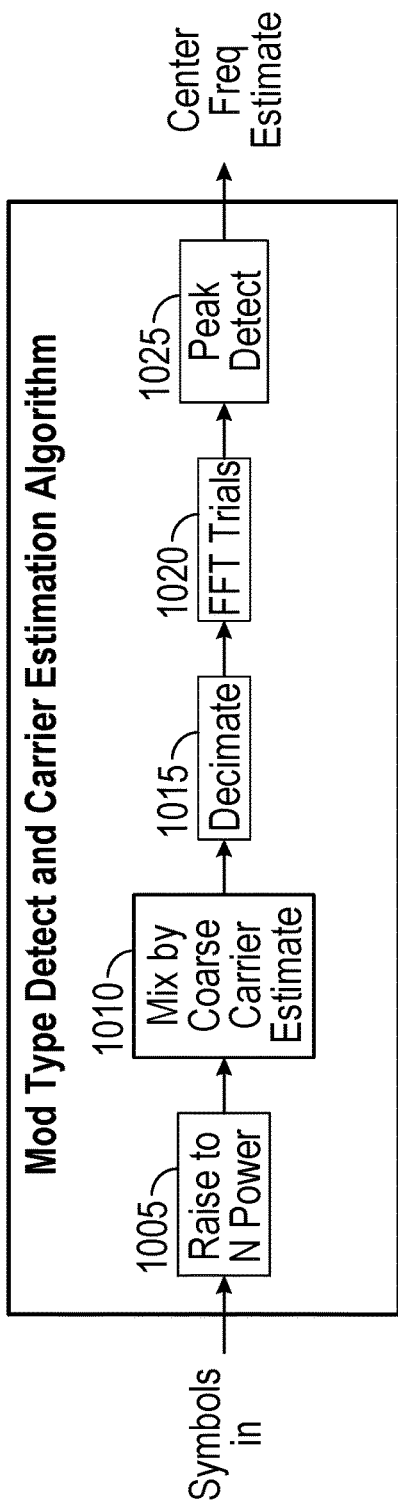

An example Mod Type Detect and Carrier Estimation function block 620 is graphically depicted in in FIG. 10. The illustrative example of function block 620 comprises a plurality of sub-function blocks, including but not limited to, Raise to N Power function block 1005, Mix by Coarse Carrier Estimate function block 1010, Decimate function block 1015, FFT Trials function block 1020, and Peak Detection function block 1025.

After timing recovery 615 of FIG. 6, the signal output from block 615 is now symbol synchronized and mod type detection becomes more accurate in the symbol space than sample space. At sub-function block 1005, the signal input into the Mod Type Detect and Carrier Estimation function block 620 is raised to the appropriate power based on the number of symbols (N) in the outer ring of the constellation (2 for BPSK, 4 for QPSK/OQPSK, 8 for 8 PSK, 12 for 16 APSK, etc.) and then mixed by coarse carrier frequency provided by Diff Conjugate calculation (if provided) at the sub-function block 1010. The mixed signal is then decimated at sub-function block 1015 and an FFT is then run on the signal at sub-function block 1020 to determine the peak-to-average ratio for the chosen modulation type at sub-function block 1025. This process is then repeated for all of the desired modulation types to be detected. The result with the highest peak-to-average is the most likely modulation type. As a way to minimize memory bandwidth the sub-function block 1005, sub-function block 1010 and sub-function block 1015 may be combined to form one sub-function block, which may decrease memory bandwidth. In order to further increase data rates, it is possible to run each modulation type trial at sub-function block 1020 on its own thread to further increase throughput.

The next processing block in method 500 is Doppler Compensation processing block 520, an example of which is graphically depicted in FIG. 7. The processing block 520 may comprise a plurality of function blocks, such as but not limited to, a phase pre-calculator function block 705 and a continuous phase adjustment function block 710. The phase corrections are precalculated at function block 705 based on the carrier estimation from the Signal Analyzer processing block 510. The Doppler Compensator processing block 520, in various embodiments, smooths compensation so that PLL based receivers can track compensated signals. This precalculated phase information from function block 705 is then fed into the Continuous Phase Adjustment function block 710 that removes the majority of the measured Doppler.

Referring back to FIG. 6, the Es/No estimator function block 625 measures the Es/No. There are several approaches to measuring Es/No that are employed depending on the modulation type. One illustrative example for measuring Es/No is to calculate (C/N)×(B/fs), where C/N is one of the carrier-to-noise ratio or signal-to-noise ratio, B is the channel bandwidth in hertz, and fs is the symbol rate or symbols per second. However, it will be appreciated that any approach for measuring Es/No will be equally applicable to the embodiments disclosed herein.

FIG. 8 graphically depicts an example of the Diversity Combiner processing block 530. Processing block 530 can be used as a stand-alone application for cases where the timing and Doppler differences between multiple signals (e.g., two in this example) is small and the modulation type is known before-hand. In various embodiments, processing block 530 can also be used in method 300 and/or 400. Processing block comprises a plurality of function blocks, for example but not limited to, Coarse Timing Estimator function block 805, Timing and Phase Error Calc function block 810, one or more Timing Adjust function blocks 815a-815n (collectively referred to as Timing Adjust(s) 815), one or more Phase Adjust function blocks 820a-820n (collectively referred to as Phase Adjust(s) 820), and Weighted Combiner function block 825. In the illustrated example, a plurality of timing adjust function blocks 815a-815n and phase adjust function blocks 820a-n are shown for executing functions on a plurality of signals. Any number of signals are possible, however the example described herein will be described with reference to two signals.

Coarse Timing Estimator function block 805 may be used when the time delta of the two arriving signals is non-negligible. This may be required for antenna hand-over cases. The Estimator function block 805 looks for a correlation spike between multiple signals (e.g., two in this example) to determine time differences. Estimator function block 805 may utilize FFTs and/or IFFTs to quickly perform correlation; however, any correlation technique may be utilized. If many correlations are required, method 300 and 400 may be applied to increase throughput.

Figure 11:
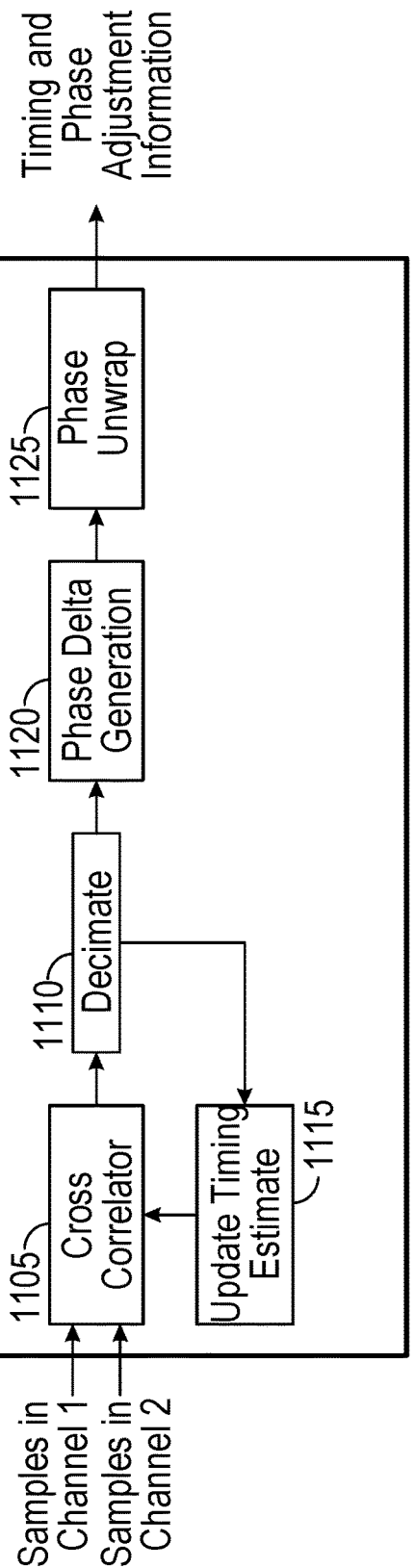
FIG. 11 is functional block diagram of an example function block of the processing block of FIG. 8, in accordance with embodiments disclosed herein.

An example of Timing and Phase Error Calculation function block 810 is graphically depicted in FIG. 11. The illustrative example of the Timing and Phase Error Calculation function block 810 comprises a plurality of sub-elements or sub-function blocks, for example but not limited to, Cross Calculator sub-function block 1105, Decimate sub-function block 1110, Update timing estimate sub-function block 1115, phase delta generation sub-function block 1120, and Phase Unwrap sub-function block 1125. The Cross Correlator sub-function block 1105 may calculate the Early, Prompt and Late (EPL) terms between the multiple input signals (e.g., two in this example) used in a Delay Lock Loop (DLL). However, SIMD techniques may be employed to calculate EPL terms efficiently. Once the EPL terms are calculated the signal is decimated at sub-function block 1110. The delta between the Early and Late terms may be used for timing updates sub-function block 1115 on the cross correlator sub-function block 1105, as well as a feed-forward error term for later timing adjustment.

The phase of the Prompt term is then calculated at Phase Delta Generation sub-function block 1120 and fed into a phase unwrap sub-function block 1125. In an example, the phase unwrap sub-function block 1125 may use a phase lock loop (PLL) in various embodiments. Phase unwrap function block 1125 include a phase calculation of the decimated signal that is performed before the phase unwrap function block 1125. The phase unwrap calculation can provide continuous phase information about the data samples. The phase unwrap calculation stitches the phase together when the phase wraps either from $\pi$ (pi) to $-\pi$ or $-\pi$ to $\pi$ radians. This unwrapping on the angle allows for a curve fitting function to run on a phase signal without any discontinuities. This can allow the processor 202 to reassemble the demodulated signal based on timing and phase of the processed signals. It may be possible to replace the phase unwrap calculation with a Kalman filter to obtain the phase, frequency and Doppler Rate information or use a PLL.

Referring back to FIG. 8, this phase information from function block 810 is then supplied to the one or more timing adjust blocks function block 815 and phase adjust blocks function block 820, to adjust the phase of the signals to properly align them for combining later on. Examples of timing adjustment and phase adjust sub-elements are described in U.S. Pat. No. 10,790,920, the disclosure of which is hereby incorporated herein by reference as if set forth in full. For example, each timing adjustment sub-element function block 815 may apply timing phase information calculated by the Timing and Phase Error Calculation function block 810. The function block 815 may then use a filter, for example but not limited to, a polyphase FIR filter in which the appropriate bank of filters is chosen based on the provided phase information as is known in the art. The timing may then be adjusted by function block 815 such that the timing adjustment is efficient both in CPU usage and in terms of bandwidth usage. The filter used in function block 815 may employ SIMD techniques to further increase through-put. It is also possible to use linear, cubic, parabolic or other forms of interpolation. Each function block 815 performs the above described adjustment on a corresponding signal of the multiple signals (e.g., two in the illustrated example).

Each of Phase Adjust function block 820 may apply carrier phase information calculated by the Timing and Phase Error Calculation function block 810. The function block 820 may apply the phase information and use SIMD techniques to adjust the phase of the entire data block so the multiple signals are properly aligned for combining. Each function block 820 performs the above described adjustment on a corresponding signal of the multiple signals (e.g., two in the illustrated example).

Once the signals have been time and phase aligned, a weighted combiner function block 825 may apply scaling based on Es/No estimates and power estimates calculated in the signal analyzer processing block 510. For example, a signal having a better signal-to-noise ratio as compared to another signal may be assigned a higher weight than the other signal and scaled accordingly. Similarly, higher Es/No estimates and/or power estimates may be assigned greater weights and scaled accordingly. SIMD techniques may be employed to efficiently scale and combine the multiple signals (e.g., two signals in this example).

Figure 12:
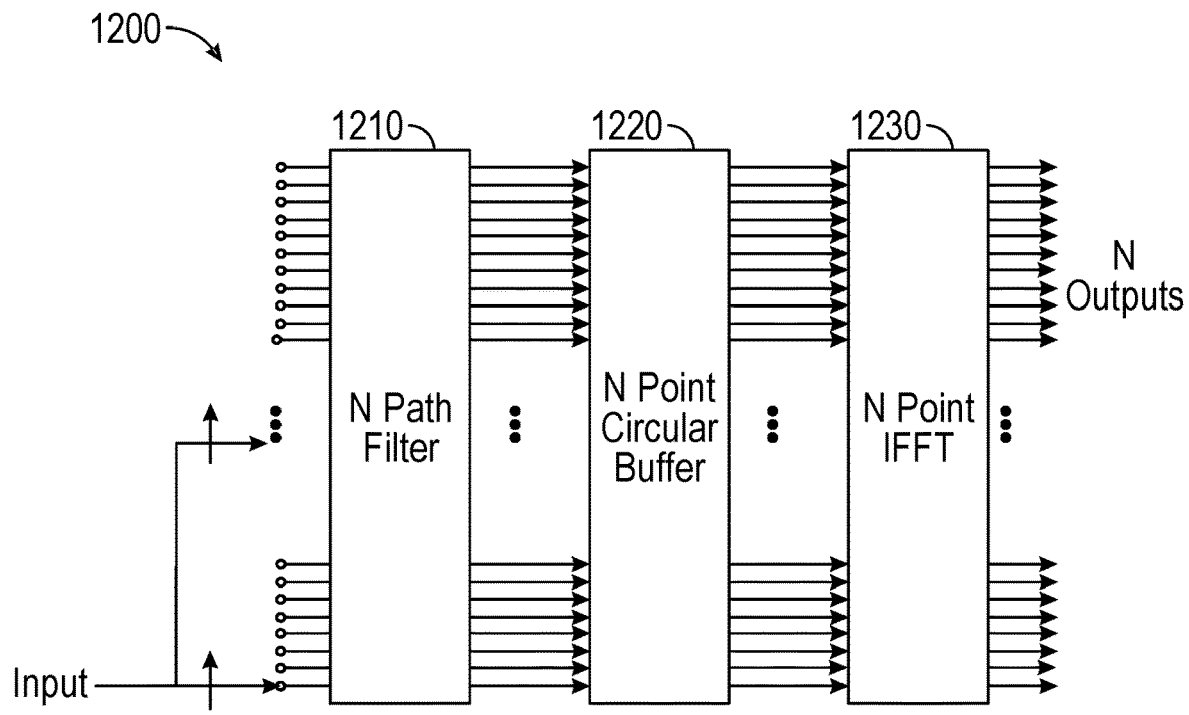
FIG. 12 is a functional block diagram of an embodiment of a digital signal channelizer, in accordance with embodiments disclosed herein

Example Embodiments of Digital Signal Channelizers and Combiners on General Purpose CPUs Employing Parallel Processing on Multiple Cores to Achieve High-Throughput Operating in a Cloud Environment FIGS. 12-16 graphically depict various embodiments of a method for digital signal channelization and combination in accordance with the embodiments disclosed herein. In various embodiments, the channelization and combination depicted in FIGS. 12-16 may be implemented for managing spectral bandwidth of one or more downlink signals. In some implementations, the methods shown in FIGS. 12-14A for digital signal channelization and/or combination may be performed using the method 300 of FIG. 3 and/or method 400 of FIG. 4. A channelizer may be configured to execute a DSP algorithm in which spectral bandwidth can be separated from one channel into many channels (1-to-N) as shown in FIG. 12. In another example, a combiner may be configured to execute a DSP algorithm in which spectral bandwidth are combined from many channels into one channel (M-to-1) as shown in FIG. 13. In some implementations, the processing starts with a network appliance (e.g., one or more of the digitizers as discussed in connection to FIG. 1) that digitize an analog signal and the samples are then transported to a channelizer (1-to-N approach illustrated in FIG. 12) or samples from a combiner are fed to the network appliance which the convert them to an analog signal (M-to-1 approach illustrated in FIG. 13).

In the case of a satellite as shown in FIG. 1, a digital signal channelizer and combiner according the embodiments herein can be used for bandwidth compression where a digitizer (e.g., one of digitizers 124, 134, and/or 144 of FIG. 1) digitizes downlink signals (e.g., one of down link signals 160 and/or 170) having a wide bandwidth but not all of the bandwidth is useful in processing. In one example, a downlink signal having 500 MHz of bandwidth can be digitized, but only a subset of slices (for example. 2 slices) of the bandwidth actually contain useful data. In this case, the channelizer creates 512 channels from the 500 MHz of bandwidth spectrum and then a combiner would combine two channels together, in which one channel could be 50 MHz and the other 100 MHz, for example. These two smaller channels (50 and 100 MHZ) would they be sent to a processing server 150 to be handled appropriately, whatever the case may be. In this example, only the sum of the subset of smaller channels (150 MHz) would need to be sent to the data center instead the entire 500 MHz. This, could save on transportation cost of sending data from the antenna to the data center. In this case, the digitized bandwidth is compressed, which also cuts down on the network bandwidth sent over a LAN or a WAN. Satellites are used as an example herein, but other wireless transmission systems may be implemented such as radio antennas (e.g., the antenna 122) or other type of transmitter. Accordingly, the use of a satellite is not limiting on this disclosure.

In another example, the digital signal channelizer and combiner according the embodiments herein can be used for channel splitting, in which an entire digitized bandwidth many contain many independent carriers. The channelizer in conjunction with the combiner in accordance with embodiments herein would then create the appropriate channels to be processed by receivers such, as the receiver described in U.S. Pat. No. 10,790,920, the disclosure of which is hereby incorporated herein by reference as if set forth in full.

In another example, the digital signal channelizer and combiner according the embodiments herein can be used for channel combining. In this case, several downlink signals received from various types of sources, either other antennas or modulators, can be combined to create a larger composite bandwidth which could then be digitally transmitted to an antenna for broadcasting to a satellite.

FIG. 12 illustrates an example channelizer processing block 1200 for separating one channel into N channels. The illustrated example channelizer processing block 1200 comprises a plurality of function blocks, for example, but not limited to an N path filter function block 1210, a N point circular buffer function block 1220, and a N point IFFT function block 1230. The channelizer block processing block 1200 may be configured to ingest a digitized sample having a first bandwidth from network appliance (e.g., a digitizer such as those described in connection to FIG. 1) through a given network protocol, for example but not limited to, TCP/IP or UDP. The sample stream is then processed at the N path filter function block 1210 using a polyphase filter bank followed by the N point circular buffer function block 1220, and followed by the N point IFFT function block 1230 to break the signal into N channels, each N channel having a corresponding bandwidth that is smaller than the first bandwidth of the ingested digitized sample.

Example sources for the input shown in FIG. 12 include, but are not limited to, modulators, digitizers (e.g., one of digitizers 124, 134, and/or 144 of FIG. 1), outputs of Diversity Combiners (such as those described above in connection to FIGS. 5-11, for example), outputs of Doppler Compensators (such as those described above in connection to FIGS. 5-11, for example), and digital sample file players.

As illustrated in FIGS. 12, 14A, and 14B, the input feeding into 1210 may represent an input signal that is interpolated by two (as shown by the split in the input signal into two arrows), as is known in the art. This allows the channelizer 1200 to avoid aliasing at the outputs since all N outputs are interpolated by two from the start of the processing.

FIG. 13 illustrates an example combiner processing block 1300 for combining M channels into one channel. The illustrated example combiner processing block 1300 comprises a plurality of function blocks, for example, but not limited to a M path filter and summer function block 1310, a M point circular buffer function block 1320, and a M point IFFT function block 1330. For the M-to-1 processing block 1300, the process is reversed as compared to the channelizer processing block 1200 of FIG. 12. For example, M channels are fed to the M point IFFT function block 1330, followed by a M point circular buffer function block 1320, and then followed by an M point filter function block 1310 using a polyphase filter bank. The filtered channels are then combined using the summer of function block 1310.

Example sources for the input shown in FIG. 13 include, but are not limited to, modulators, digitizers (e.g., one of digitizers 124, 134, and/or 144 of FIG. 1), outputs of Diversity Combiners (such as those described above in connection to FIGS. 5-11, for example), outputs of Doppler Compensators (such as those described above in connection to FIGS. 5-11, for example), channelizers (such as those described in connection to FIG. 12), and digital sample file players. As described above in connection to FIG. 12 and as illustrated in FIGS. 14A and 14B, each input feeding into 1200a-1200n, respectively, may represent an input signal that is interpolated by two (as shown by the split in the input signal into two arrows), as is known in the art. This allows each channelizer 1200a-1200n to avoid aliasing at the outputs since all N outputs are interpolated by two from the start of the processing.

In some embodiments, it is possible to use one or more channelizers and one or more combiners in combination to achieve any desired bandwidth out of the one or more channelizers as shown in FIGS. 14A and 14B. For example, as shown in FIG. 14A, a digitized downlink signal may be broken in to N channels (e.g., 512 channels in this example) using one or more channelizers, for example, channelizer processing blocks 1200a-1200n. Each of the N channels may have a bandwidth that is smaller than the digitized downlink signal. In some embodiments, each channelizer processing block 1200a-1200n may receive a discrete downlink signal, such that each Input a through Input n is not necessarily part of the same downlink signal. Thus, each input may be independent of the other inputs.

Once the input signals are each broken into respective N channels, M (e.g., 20 in this example) of those channels may be recombined to form a larger channel using a combiner, for example, combiner processing block 1300 (e.g., where only a single combiner 1300 as shown in FIG. 14A).

In some embodiments, a plurality of combiner processing blocks 1300a-1300n may be utilized, as shown in FIG. 14B. As shown in FIG. 14B, a digitized downlink signal may be broken in to N channels (e.g., 512 channels in this example) using a channelizer, for example, a channelizer processing block 1200. Once the input signal is broken into respective N channels, M (e.g., 20 in this example) of those channels may be recombined to form a larger channel using a combiner, for example, a plurality of combiner processing blocks 1300a-n. Each combiner processing block 1300a-n may ingest N channels and combine M channels to form a larger combined channel that is output from each processing block 1300 as Output a through Output n.

The selected channels for recombination may include be those channels on which the useful data is transmitted. Which data is useful may be dependent on the system processing the downlink. This methodology can be used split the digitized signal into N channels of smaller bandwidth and then to gather any of the N channels into a wider channel of any size M. Thereby, compressing the bandwidth and reducing the network resources needed for processing and transmitting the downlink signal. Thus, while the illustrative example describes 512 elements may be channelized by a given channelizer 1200 in the above example and 20 elements are combined by a given combiner 1300, it will be appreciated that any number of elements as desired may be channelized by the one or more channelizers and any number of elements may be combined as desired may be combined using the combiner. This allows the channelizer channel bandwidths to be fully programmable and have any number of channels.

In FIG. 14A, two input channels are shown, but it is possible to run any number of input channels as desired, for example, one, two or more input channels, 50 or more input channels, 100 or more input channels. Where one input channel is used, FIG. 14 may utilize a single channelizer processing block. Similarly, FIG. 14B depicts two output channels, but it is possible to run any number of combiner processing blocks as desired, for example, one, two, or more output channels. Where one output channel is used, FIG. 14A may utilize a single combiner processing block. Thus, in some embodiments, multiple combiners (e.g., combiner processing blocks 1300*a-n*) may be placed after one or more channelizer processing blocks to output many channels of scaled bandwidths of M/N. In addition, a gain stage (not shown) after the channelizer and combiner can be added to achieve either manual gain control or automated gain control of each channel.

Example sources for each of the inputs shown in FIGS. 14A and 14B include, but are not limited to, modulators, digitizers (e.g., one of digitizers 124, 134, and/or 144 of FIG. 1), outputs of Diversity Combiners (such as those described above in connection to FIGS. 5-11, for example), outputs of Doppler Compensators (such as those described above in connection to FIGS. 5-11, for example), and digital sample file players. In some examples, channelizers and combiners may be cascaded together. For example, a first channelizer/combiner may feed into another channelizer/combiner. In this case, the first channelizer/combiner may be configured to process any number of inputs at low sample rates and output a combined signal to another channelizer/combiner, which may output at a higher rate. For example, 100 modulators each running at 10 kSPS could be combined into a one channel running at 1 MSPS. This 1 MSPS channel may then be fed into another channelizer/combiner in which the final output sample rate is 512 MSPS. In some embodiments, each channelizer/combiner may be performed by separate processing blocks, such as one or more of blocks 315*a*, 315*b*, . . . 315*n* of FIG. 4 and/or one or more of blocks 306*a*, 306*b*, . . . 306*n* of FIG. 3. That is, for example, a first channelizer/combiner may be performed in a first one or more processing block and the second channelizer/combiner performed in a second one or more processing blocks.

In some embodiments, method 1400*a* and 1400*b* may include an optional combiner input control 1410 (as illustrated in FIG. 14A, but not shown in FIG. 14B) configured to time align inputs received from the one or more channelizer processing blocks 1200. For example, since one possible example implementation of the channelizer/combiner shown in FIG. 14 is to replace existing analog radio frequency (RF) switch Matrices, it may be desirable to maintain and match RF switch Matrices current capabilities. One such capability is time alignment. Since RF switch Matrices are near-zero delay combination or splitting of signals, time-alignment is trivial in the analog domain. However, once signals have been digitized and sent into networks, such as Cloud environments in which is transported over LANs or WANs, time alignment may no longer be as trivial. Time stamps may be applied to each input channel and maintained through-out all processing in one or more of channelizer processing blocks 1200. Then at a combiner input control 1410, data may be collected and buffered for a short, programmable (e.g., preset) duration of time in order to allow inputs to arrive within the duration of time. If all inputs arrive in time, then they may be carefully time aligned based on the corresponding input rate and time stamp of each channel by the combiner input control 1410. However, if a channel does not arrive on time, the combiner input control 1410 may replace that channel with all zeros data source so the timely channels are not blocked or delayed further. In this way, the channelizer/combiner of FIG. 14A can replicate the near-zero delay combination present in RF switch Matrices. Similarly, a combiner input control 1410 may be included in method 1400*b* between the channelizer 1200 and the plurality of combiners 1300*a-n* and configured similar to that described herein.

In some embodiments, the methods 1400*a* and 1400*b* may also include a data split function that splits data of a given downlink signal into parallel data streams by a data splitter. Each of the channelizer of FIG. 12, the combiner of FIG. 13, and/or the combined channelizer/combiner of FIGS. 14A and 14B may be preceded by a data split function, such as block 310 of FIG. 4. For example, each channelizer 1200 and/or each combiner 1300 as shown in FIGS. 14A and 14B may be an example of one or more processing blocks 315 of FIG. 4 and block 310 can split the data into parallel data streams as described in connection with FIG. 4. The block 310 may be referred to as a manager (or dealer) processing block in some embodiments. Splitting the data into multiple parallel streams can allow for a plurality of channelizer portions 1200*a-n* to function in parallel threads for channelizing a downlink signal, a plurality of combiner portions 1300*a-n* to function in parallel threads to combine a downlink signal, and/or both one or more channelizers 1200 to function in parallel with one or more combiners 1300. For example, in case of channelizer processing block 1200 of FIG. 14A, each channelizer processing block 1200 may be implemented as one or more blocks 315*a-n* of FIG. 4. In the case of combiner processing block 1300 of FIG. 14B, each combiner 1300 may be implemented as one or more of blocks 315*a-n* of FIG. 4. In both cases, block 310 can split the data from a downlink signal into parallel data streams each having overlap to an adjacent data stream (e.g., as described above in connection to FIG. 4). Then each parallel data stream can be sent to one of processing block 315*a-n* for processing. Once each processing block 315*a-n* has completed processing its portion of data, the processed portion of data is then sent to, for example, block 320 of FIG. 4 which outputs the processed data. Block 320 then waits for the next processing block (e.g., the second block 315*b*) to complete its processing and so on to output each portion of processed data. This process may be referred to as a round-robin dealing scheme.

The higher the throughput desired for a given application, the more processing blocks 315 that are required. For example, with reference to FIG. 14B, if 512 MSPS is required as the output of a given combiner processing block 1300, it may possible to create up to "n" number of processing blocks 315 each implemented as a combiner processing block 1300 (e.g., one of combiner processing blocks 1300*a-n*) to send outputs a through n. In this case, the first portion of input data would be sent from or dealt by the block 310 to a first processing block 315*a* (e.g., implemented first combiner processing block 1300*a*) to be processed. A small portion of the data of the processed data from block 315*a* may be saved and prepended by the block 310 as overlap data on the next portion of the data stream.

This next portion of the data stream, including the overlap data, is then sent to a second processing block 315b (e.g., implemented as a second combiner processing block 1300a). This pattern is repeated with as many processing blocks as is required to achieve the required high-throughput. When each of the processing blocks (e.g., the block 315a-n) is done processing its portion of data, the processed portion of data is then sent to, for example, block 320 to be output as combined processed data. Block 320 then waits for the next processing block (e.g., the second block 315b) to complete its processing and so on to output blocks of data. In some embodiments, block 310 may receive outputs from channelizer 1200 and split the outputs as described above for feeding into the plurality of combiners 1300a-n. In another embodiment, the block 310 may precede the channelizer 1200 for splitting the downlink signal. The processing blocks of 315a to 315n are the used in this round-robin dealing scheme in which the block 310 as the manager or dealer cycles through all the processing blocks.

While the above example is described in connection to one or more combiners 1300, it will be appreciated that the round-robin dealing scheme described above for splitting and dealing portions of data to each processing block may be utilized in any of the embodiments described herein. For example, the round-robin dealer scheme may be used for channelizer processing blocks 1200a-n of FIG. 14a as well to also achieve high-throughput. That is, each channelizer processing block 1200 may be a implemented as a processing block 315a-n and a data splitter block 310 may split data into parallel streams and deal each parallel portion to a given processing block 315a-n as channelizers. Each channelizer 1200a-n may process its portion and output each plurality of N channels from each channelizer 1200a-n to the block 320 upon completion. Block 320 outputs the processed portion of data as described above and waits for the next processing block 315 to complete its processing. Similarly, this round-robin dealing scheme may be utilized in connection with the Diversity Combiner with Blind Detection and Doppler Compensation method of FIGS. 5-11. That is, any one of the processing blocks 510-530 may be implemented as one or processing blocks 315a-n and a data splitter function at block 310 may split input downlink signals into parallel data streams for feeding into each processing block 315a-n in the manner described above. The resulting processed data, for each processing block 315, may then be sent to the block 320 for output as described above.

In some implementations, a digital channelizer and/or combiner processing block (e.g., such as 1200, 1300, and/or 1400 described above) enabled by the SPS 150 (e.g., using general purpose CPUs and employing SIMD techniques, for example but not limited to, including SSE, SSE2, SSE3, SSE4.1, SSE4.2, AVX, AVX2 and AVX512 instruction sets) can process data spread over several cores of the CPU to increase throughput. The data processing can be managed over multiple cores (e.g., the blocks 315) of the processors to achieve the necessary throughput without the use of dedicated signal processing hardware such as FPGAs or High Performance Computing (HPC) hardware such as Graphics Processing Units (GPUs). An example of a representative block 315 implemented as a channelizer is shown in FIG. 15. The ability to perform this processing in general-purpose server CPU allows the functions to be deployed within a general-purpose cloud processing environment using a virtualized processing architecture without the need for dedicated hardware, such as but not limited to, x86 architecture, Cortex-A76, NEON and AWS Graviton, Graviton2, and the like.

FIGS. 15 and 16 graphically depict example processing blocks implemented as a channelizer processing block 1500 or a combiner processing block 1600, respectively. The channelizer processing block 1500 may be substantively similar to the channelizer processing block 1200 described in connection to FIG. 12. For example, the channelizer processing block 1500 may separate one channel into N channels using, for example, a N path filter function block 1510, a N point circular buffer function block 1520, and a N point IFFT function block 1530. The channelizer processing block 1500 is an illustrative example of a channelizer implemented as one of processing blocks 315a-315n (e.g., FIG. 4) and/or one of functions 306a-306n (e.g., FIG. 3). A plurality of channelizer processing blocks 1500 may be provided each as one of processing blocks 315a-315n (e.g., FIG. 4) and/or one of functions 306a-306n (e.g., FIG. 3). In another embodiments, functions for executing a single channelizer processing block 1500 may be distributed amongst a plurality of processing blocks 315a-315n (e.g., FIG. 4) and/or one of functions 306a-306n (e.g., FIG. 3). In some embodiments, the round-robin dealing scheme described above in connection to FIGS. 12-14B may be implemented using a plurality of processing blocks 1500. For example, a plurality of processing block 1500 may be implemented as processing blocks 315a-n. Thus, the plurality of processing blocks 1500 may be operable in parallel using the round-robin dealing scheme as described above.

Similarly, the combiner processing block 1600 may be substantively similar to the combiner processing block 1300 described in connection to FIG. 13. For example, the combiner processing block 1600 may combine M channels into one channel using, for example, a M path filter and summer function block 1610, a M point circular buffer function block 1620, and a M point IFFT function block 1630. The combiner processing block 1600 is an illustrative example of a combiner implemented as one of processing blocks 315a-315n (e.g., FIG. 4) and/or one of functions 306a-306n (e.g., FIG. 3). A plurality of combiner processing blocks 1600 may be provided each as one of processing blocks 315a-315n (e.g., FIG. 4) and/or one of functions 306a-306n (e.g., FIG. 3). In another embodiments, functions for executing a single combiner processing block 1600 may be distributed amongst a plurality of processing blocks 315a-315n (e.g., FIG. 4) and/or one of functions 306a-306n (e.g., FIG. 3). In some embodiments, the round-robin dealing scheme described above in connection to FIGS. 12-14B may be implemented using a plurality of processing blocks 1600. For example, a plurality of processing block 1600 may be implemented as processing blocks 315a-n. Thus, the plurality of processing blocks 1600 may be operable in parallel using the round-robin dealing scheme as described above.

The channelizer and/or combiner described herein are examples of memory bandwidth optimization described above. Functions of a channelizer can be separated into separate blocks as shown in FIGS. 15 and 16 or combined into one function sub-element or block in which small portions of data is processed. In this illustrative examples, a small portion may refer to one IFFT's worth of data. In the case where the functions are separated for a channelizer, many filter calculations may be ran, followed by many circular buffers, and then followed by many IFFTs. Similarly, in the case where the functions are separated for a combiner, many IFFTs may be ran, followed by many circular buffers, and followed by many filter calculations.

An example non-limiting advantage of using general purpose CPUs is the dynamic nature of resource allocation. For example, in the case of the channelizer/combiner as described in connection to FIGS. 14A and 14B, it may be desirable to reconfigure the system in real time in which input channels can come and go at any moment. As shown in FIG. 14A, by the processing blocks of channelizers 1200a-n, these channelizers 1200a-n can each be created and destroyed to accomplish this goal. Any value of N may be employed to accommodate an input bandwidth as well as any number of channelizers 1200n can be instantiated to handle the appropriate amount of input channels. In this way, as an illustrative example, at one moment, ten channels of 15 MHz each could be combined, and then one second later, five channels of 45 MHz could be combined. The distribution of processing the data at high-throughputs is possible because of all the techniques discussed in the present disclosure, such as multiple cores, SIMD techniques and memory bandwidth optimization approaches. While the example provided herein is described in connection to the channelizer/combiner as illustrated in FIG. 14A, this beneficial result is equally achievable by using the techniques described herein on diversity combiners and doppler compensation, for example, as described in connection to FIGS. 5-11 and 14B. For example, any value of number of processing blocks 510, processing block 520, and/or processing block 530 of FIG. 5 may be employed to achieve a desired throughput. The number of each processing blocks 510-530 of FIG. 5 may be dynamically created and destroyed to accomplish in a manner similar to that described above to achieve a desired throughput.

Other Aspects

The accompanying claims and their equivalents are intended to cover such forms or modifications as would fall within the scope of the disclosure. The various components illustrated in the figures may be implemented as, for example, but not limited to, software and/or firmware on a processor or dedicated hardware. Also, the features and attributes of the specific example embodiments disclosed above may be combined in different ways to form additional embodiments, all of which fall within the scope of the disclosure.

The foregoing method descriptions and the process flow diagrams are provided merely as illustrative examples and are not intended to require or imply that the operations of the various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an," or "the" is not to be construed as limiting the element to the singular.

The various illustrative logical blocks, modules, and algorithm operations described in connection with the embodiments disclosed herein may be implemented as electronic hardware, computer software, or combinations of both. To clearly illustrate this interchangeability of hardware and software, various illustrative components, blocks, modules, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present inventive concept.

The hardware used to implement the various illustrative logics, logical blocks, and modules described in connection with the various embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more exemplary embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in processor-executable instructions that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include random access memory (RAM), read-only memory (ROM), electrically erasable programmable read-only memory (EEPROM), FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects.

Thus, the claims are not intended to be limited to the aspects shown herein, but is to be accorded the full scope consistent with the language claims, wherein reference to an element in the singular is not intended to mean "one and only one" unless specifically so stated, but rather "one or more."

The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more.

What is claimed is:

1. A method for managing channel bandwidth of one or more downlink signals, the method comprising:
   receiving the one or more downlink signals from one or more antenna feeds, the one or more downlink signals having a first bandwidth;
   in a first one or more processing blocks in one or more processors,
      performing a first channelizer operation on a first portion of the one or more downlink signals that creates a first plurality of channels, each of the first plurality of channels having a bandwidth smaller than the first bandwidth;
   in a second one or more processing blocks in the one or more processors in parallel with the first one or more processing blocks,
      performing a second channelizer operation on a second portion of the one or more downlink signals that creates a second plurality of channels, each of the second plurality of channels having a bandwidth smaller than the first bandwidth; and
   outputting the first and second plurality of channels to a network.

2. The method of claim 1, wherein the first one or more processing blocks comprises a first one or more central processing unit (CPU) cores and the second one or more processing blocks comprises a second one or more CPU cores.

3. The method of claim 1, wherein the one or more processors comprises a plurality of processors, wherein in the first one or more processing blocks are comprised in a first processor of the plurality of processors and the second one or more processing blocks are comprised in a second processor of the plurality of processors.

4. The method of claim 1, wherein the one or more processors comprises a single processor comprising the first one or more processing blocks and the second one or more processing blocks.

5. The method of claim 1, wherein the first channelizer operation comprises a first plurality of functions including:
   ingesting samples from an input channel, the samples received as first data packets included in the first portion of the one or more downlink signals;
   applying a multiple path filter on the samples;
   executing a multiple point circular buffer on the filtered samples; and
   separating the samples into multiple channels based on applying a multiple point Inverse Fast Fourier Transform to the samples.

6. The method of claim 5, wherein the first one or more processing blocks comprises a first plurality of processing blocks, wherein performing the first channelizer operation comprises distributing the first plurality of functions amongst the first plurality of processing blocks and performing the distributed first plurality of functions in parallel.

7. The method of claim 5, wherein the second channelizer operation comprises a second plurality of functions including:
   ingesting samples from an input channel, the samples received as second data packets included in the second portion of the one or more downlink signals;
   applying a multiple path filter on the samples;
   executing a multiple point circular buffer on the filtered samples; and
   separating the samples into multiple channels based on applying a multiple point Inverse Fast Fourier Transform to the samples.

8. The method of claim 7, wherein the second one or more processing blocks comprises a second plurality of processing blocks, wherein performing the second channelizer operation comprises distributing the second plurality of functions amongst the second plurality of processing blocks and performing the distributed second plurality of functions in parallel.

9. The method of claim 8, wherein one or more of the second plurality of functions are performed in the second one or more processing blocks in parallel with one or more of the first plurality of functions performed in the first one or more processing blocks.

10. The method of claim 1, further comprising dividing, at one or more processors, the digital bit stream into a plurality of data packets, each of the data packets of the plurality of data packets including an overlap of data from an adjacent packet.

11. The method of claim 1, wherein the one or more processors are one or more general-purpose central processing units (CPU).

12. The method of claim 1, wherein the one or more processors employ single instructions, multiple data (SIMD) techniques to achieve high throughput.

* * * * *